(12) United States Patent
Jeon et al.

(10) Patent No.: US 9,949,272 B2
(45) Date of Patent: Apr. 17, 2018

(54) SDN-BASED LTE NETWORK STRUCTURE AND OPERATION SCHEME

(71) Applicant: Samsung Electronics Co., Ltd, Gyeonggi-do (KR)

(72) Inventors: Youngki Jeon, Gyeonggi-do (KR); Seongryong Kang, Gyeonggi-do (KR); Woojae Kim, Gyeonggi-do (KR); Jonghyune Kim, Seoul (KR); Jungah Choi, Seoul (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 14 days.

(21) Appl. No.: 14/901,465

(22) PCT Filed: Jun. 25, 2014

(86) PCT No.: PCT/KR2014/005623
§ 371 (c)(1),
(2) Date: Dec. 28, 2015

(87) PCT Pub. No.: WO2014/209007
PCT Pub. Date: Dec. 31, 2014

(65) Prior Publication Data
US 2016/0374095 A1 Dec. 22, 2016

(30) Foreign Application Priority Data

Jun. 25, 2013 (KR) .................. 10-2013-0073329

(51) Int. Cl.
*H04W 72/04* (2009.01)
*H04W 8/24* (2009.01)
(Continued)

(52) U.S. Cl.
CPC ......... *H04W 72/0493* (2013.01); *H04L 41/04* (2013.01); *H04L 45/64* (2013.01);
(Continued)

(58) Field of Classification Search
CPC .......... H04L 41/04; H04L 45/64; H04W 8/24; H04W 72/0493; H04W 76/022;
(Continued)

(56) References Cited

U.S. PATENT DOCUMENTS

2011/0261723 A1  10/2011  Yamato et al.
2011/0261825 A1  10/2011  Ichino
(Continued)

FOREIGN PATENT DOCUMENTS

WO   WO 2012/128487 A2   9/2012

OTHER PUBLICATIONS

International Search Report dated Oct. 7, 2014 in connection with International Patent Application No. PCT/KR2014/005623, 5 pages.
Written Opinion of International Searching Authority dated Oct. 7, 2014 in connection with International Patent Application No. PCT/KR2014/005623, 5 pages.

*Primary Examiner* — Jae Y Lee

(57) ABSTRACT

The present invention relates to a network structure for effectively applying a software-defined networking (SDN) technology to an LTE network and an operation of a system on the basis of the same. The present invention therefore provides a method for controlling communication by an SDN controller in an SDN-based wireless communication network, the method comprising the steps of: receiving information on a UE from a gateway controller as the UE initially accesses an eNB; selecting at least one Openflow switch (OFS) for processing traffic of the UE on the basis of the information; and transmitting a request for setting a packet forwarding rule for processing the traffic of the UE to the at least one OFS.

18 Claims, 37 Drawing Sheets

(51) Int. Cl.

| | |
|---|---|
| *H04L 12/24* | (2006.01) |
| *H04W 76/02* | (2009.01) |
| *H04W 40/34* | (2009.01) |
| *H04L 12/715* | (2013.01) |
| *H04W 24/04* | (2009.01) |
| *H04W 88/16* | (2009.01) |

(52) U.S. Cl.
CPC ............ *H04W 8/24* (2013.01); *H04W 40/34* (2013.01); *H04W 76/022* (2013.01); *H04W 24/04* (2013.01); *H04W 88/16* (2013.01)

(58) Field of Classification Search
CPC ... H04W 40/34; H04W 76/041; H04W 24/04; H04W 88/12; H04W 88/16; H04J 11/00
See application file for complete search history.

(56) References Cited

U.S. PATENT DOCUMENTS

| | | | |
|---|---|---|---|
| 2012/0300615 A1* | 11/2012 | Kempf | H04W 24/02 370/216 |
| 2013/0028091 A1 | 1/2013 | Sun et al. | |
| 2014/0019578 A1 | 1/2014 | Lim et al. | |
| 2014/0177634 A1* | 6/2014 | Jiang | H04L 45/64 370/392 |
| 2014/0254373 A1* | 9/2014 | Varma | H04W 40/36 370/235 |
| 2015/0141009 A1* | 5/2015 | Tamura | H04W 40/38 455/435.1 |
| 2015/0156336 A1* | 6/2015 | Tamura | H04W 48/18 455/406 |

* cited by examiner

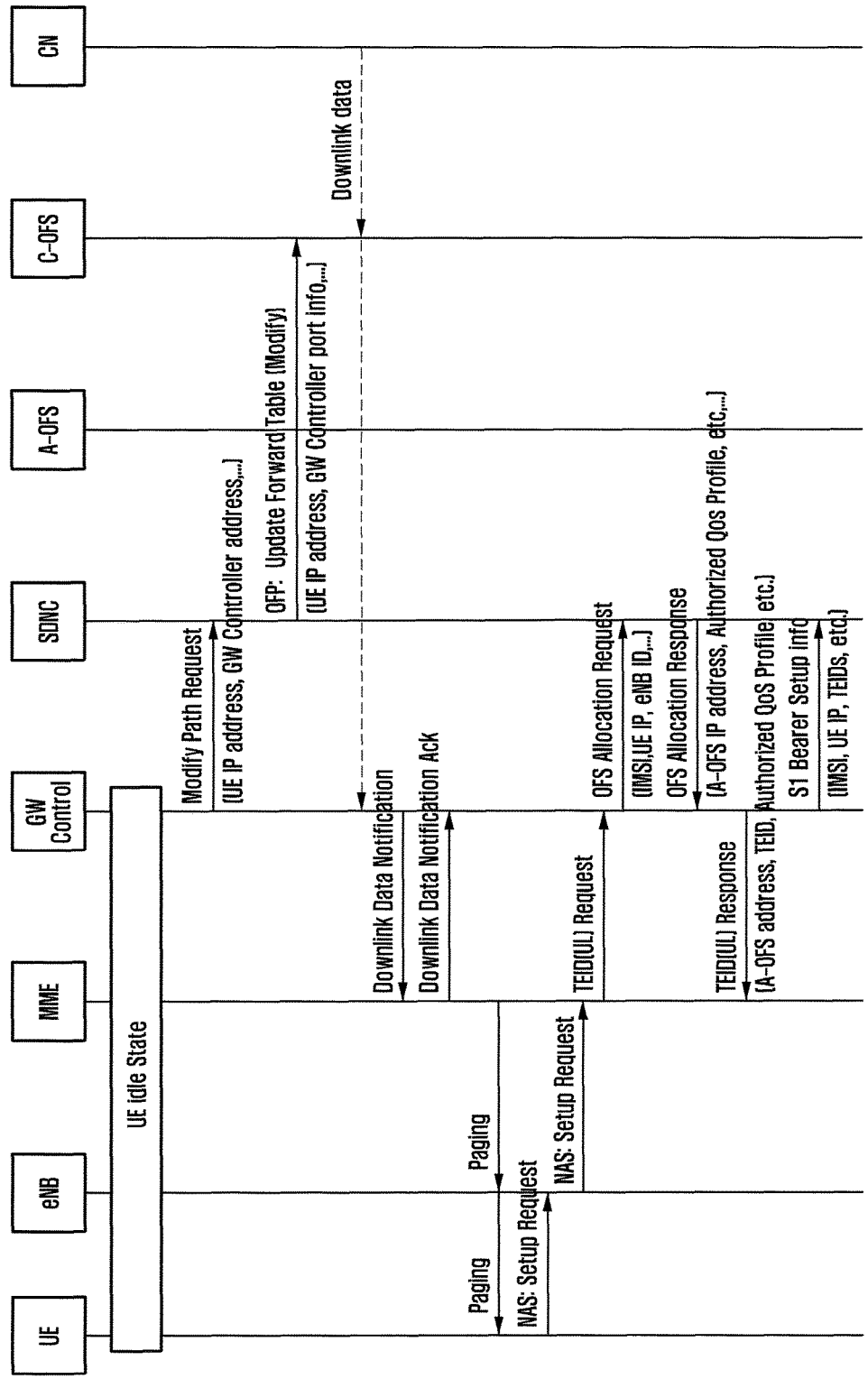

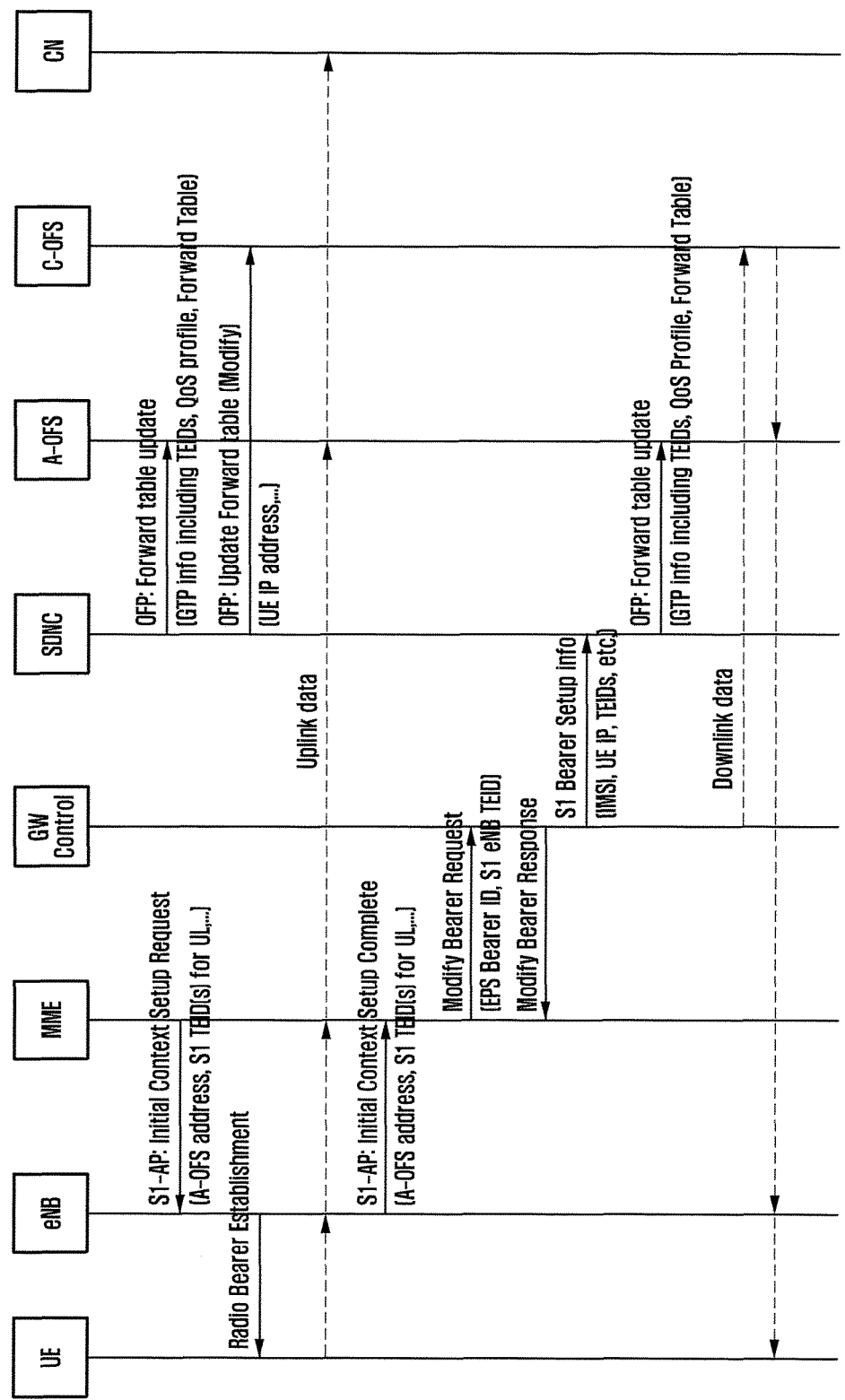

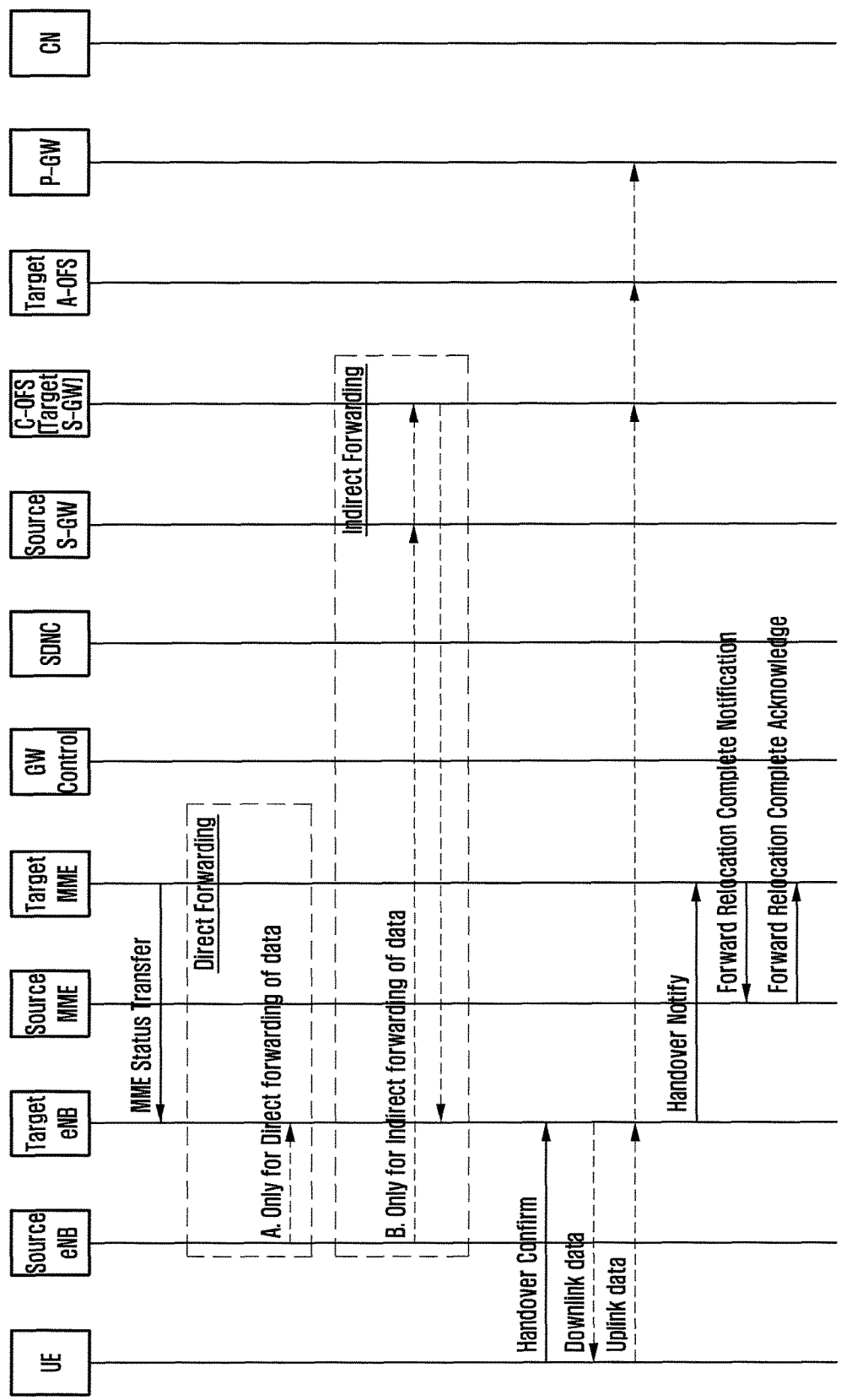

SDN-BASED LTE NETWORK STRUCTURE AND OPERATION SCHEME

CROSS-REFERENCE TO RELATED APPLICATION(S)

The present application claims priority under 35 U.S.C. § 365 to International Patent Application No. PCT/KR2014/005623 filed Jun. 25, 2014, entitled "SDN-BASED LTE NETWORK STRUCTURE AND OPERATION SCHEME", and, through International Patent Application No. PCT/KR2014/005623, to Korean Patent Application No. 10-2013-0073329 filed Jun. 25, 2013, each of which are incorporated herein by reference into the present disclosure as if fully set forth herein.

TECHNICAL FIELD

The present invention relates to a network structure for effectively applying a software-defined networking (SDN) technology to an LTE network and an operation of a system on the basis of the same. More particularly, the present invention relates to a technology for effectively applying SDN to the LTE network without changing a UE or an eNB by defining changes of existing Network Elements (NEs), additional NEs, and functions thereof. Further, the present invention defines the structure and operation of SDN-based LTE network capable of co-existing with existing networks, when applying the SDN technology to the LTE network, in consideration of interworking with the LTE network to which the SDN is not applied.

BACKGROUND ART

The conventional technology discloses a patent on an Openflow based communication technique for implementing SDN and a patent on technology for transmitting traffic based on the Openflow after placing an EPC on a cloud in an LTE network.

U.S. Ser. No. 13/176,619, Openflow Communication System and Openflow Communication Method, Kiyohisa Ichino (NEC Corporation)

U.S. Ser. No. 13/536,838, Implementing EPC in a Cloud Computer with Openflow Data Plane, James Kempf, et al. (Telefonaktiebolaget LM Ericsson).

Software-Defined Networking (SDN) is a technology that separates a control plane and a data plane and concentrates the control plane on a single controller. In the SDN scheme, the data plane is simply in charges of traffic forwarding, and information on where to and how to transfer traffic is determined by a central controller. In particular, the controller provides various APIs through a northbound API and enables programming using the various APIs to perform various traffic controls based on network information. An Openflow protocol can be a protocol that supports the SDN to operate, and is also referred to as a southbound protocol that transfers forwarding information between the controller and a switch and that transfers a state of a switch or traffic information, etc. to the controller.

The first patent relates to an Openflow technology and generally discloses an operation of Openflow and an operation method in a switch to which Openflow is applied. The second patent relates to a method for implementing the EPC in the cloud. As a method for implementing the EPC in the cloud, proposed is a method for separating the control plane and data plane, implementing the control plane in the cloud, additionally executing the control function within the cloud when a virtualized control function is further needed depending on the traffic load, and then realizing the interworking of the data plane and the control plane using an openflow technique.

The present invention proposes the following three examples of the services performed in the SDN-based LTE Network. The first is for interworking with the cache installed in the eNB, the second is for VoLTE traffic transmission, and the third is for a 1:N media sharing service. A previous study carried out for each is as follows.

An operation of the prior art with respect to an access cache and a core cache that provide a content caching function in an eNB and a core is described in the following. If the UE requests the content, an access cache located in an eNB site initially checks whether the same content is stored therein, and when the same content is stored, transmits the content to the UE. At this time, a method for transferring traffic can be different depending on a method for implementing the core cache and access cache. When using a technique referred to as byte caching, even if the content of the UE is stored in the access cache, in order to transmit the content to the UE by the access cache, it must be known which content is to be transmitted to the core cache. To this end, the access cache transmits a small packet referred to as a label to the core cache. The access cache receives the label, extracts a content corresponding to the label from the storage, makes the content into a packet, and transmits the packet to the UE. On the other hand, when using a technique called object caching, the access cache performs the role of a content source and directly transmits the content to the UE, and the core cache does not transfer the content to the UE.

A basic operation defined in the standard with respect to the VoLTE service is as follows. A transmission UE, which is trying to a call, transmits a voice packet to a network based on information of a reception UE. The voice packet is transmitted to the reception UE through an IMS located on top of the EPC and passes through the EPC again. The response of the reception UE is also transmitted through the same path.

A 1:N media sharing service means a personal broadcasting environment where a single UE can be a content providing source and a plurality of UEs may receive the content. In this case, the transmission UE requires a procedure of registering the content to be transferred by the transmission UE itself, and the reception UE should inform of the intention to receive the content to the server. Further, the content transmitted by the transmission UE is transferred to a media sharing server and copied and transferred to each of the reception UEs in a unicast transmission.

DESCRIPTION OF THE INVENTION

Technical Problem

An Openflow protocol that is a base of an SDN technology has already been standardized, an a method for transmitting traffic is defined, but for now it is not clear that any benefits can be acquired by only the traffic transmission method. In addition, since the SDN technology has been mainly applied to a switch that connects servers within a data center until now, a discussion of how to apply the SDN technology to an LTE network has not been actively undertaken yet.

In addition, the conventional technology proposes a method of utilizing Openflow in the LTE network, and it has focused on the EPC virtualization and mainly describes an example of applying Openflow to a necessary technology when virtualizing the EPC. Such a conventional content caching technology can exhibit an effect only when contents requested by the UE are stored in an access cache installed in an eNB site. According to the conventional technology, when a corresponding content is not stored in an access cache interworking with an eNB to which the UE can be accessed, but the corresponding content is stored in an access cache interworking with an adjacent eNB, there can be no method of transferring the content to the UE. Therefore, even if a corresponding content is stored in the access cache of the adjacent eNB, UE traffic should be transmitted to a core and all contents should be transmitted through a backhaul in order to store the corresponding content at the access cache.

For VoLTE traffic, according to the conventional technology, even if both the transmission and reception UEs are in a single eNB or an eNB adjacent to each other, voice traffic should be transmitted through the switch/router that is installed on top of the EPC so that unnecessary packet transmission latency is generated and as a result the backhaul is wasted. This problem may occur in the 1:N media sharing service. That is, when both the transmission UE and reception UE exist in a single eNB, a media packet may be processed in a single eNB or may be all processed in a switch at top of the eNB so that it does not have to waste the backhaul. However, this method is not available for the current LTE network.

The present invention is a technology not covered in the existing SDN-related research when applying the SDN to the LTE Network, and defines a basic network structure, functions of NEs, additional NEs, and an interworking method with the existing LTE network. In particular, the present invention applies Openflow to a switch that connects the eNB with the backhaul, and when a server for providing a service exists in the eNB stage, ties them as a pool and transfers the traffic of the UE to the appropriate server so that the service quality of the UE is increased, a use amount of the backhaul is reduced, and utilization of the server of the eNB stage is increased. In addition, the present invention includes an embodiment which can improve the service performance by utilizing a caching function which is submitted from eNB stage. In addition, the present invention includes an embodiment for traffic transmission optimization in the 1:N media sharing service with the transmission optimization of the VoLTE traffic.

Solution to Problem

In accordance with an aspect of the present invention, a method for controlling communication by an SDN controller in a Software-Defined Networking (SDN) based wireless communication network is provided. The method includes: receiving information on a UE from a gateway controller as the UE initially accesses an eNB; selecting at least one Openflow switch (OFS) for processing traffic of the UE on the basis of the information; and transmitting a request for setting a packet forwarding rule for processing the traffic of the UE to the at least one OFS.

In accordance with another aspect of the present invention, a method for controlling communication by a gateway controller in a Software-Defined Networking (SDN) based wireless communication network is provided. The method includes: allocating an IP address to a UE when a request for connecting to an eNB by the UE is received; transmitting information on the UE to an SDN controller; and receiving, from an SDN controller, information on at least one Openflow switch (OFS) which is selected for processing traffic of the UE based on the information on the UE.

Advantageous Effects of Invention

The SDN-based LTE network architecture as defined in the present invention allows the transmission of a UE IP Packet by minimizing a GTP tunnel interval. Accordingly, the present invention may transmit the UE IP packet in an access interval through the optimum path to provide a service while minimizing the use of the backhaul when providing an application service in the access interval. Further, according to the present invention, since all LTE networks are configured by an Openflow switch based on an SDN controller, signal traffic for the control is increased but it has an advantage in that a network becomes simple and the network management becomes easy. This is a benefit that can be obtained by applying the SDN/Openflow to the LTE network. In addition, according to the present invention, a role of SGW/PGW is performed by A-OFS/C-OFS so that an entity for configuring a network can be reduced and the control plane of the SGW/PGW can be virtualized and then installed on the cloud to configure a network which can efficiently use resources.

Effects which can be achieved by interworking a smart cache system and an SDN-based LTE network are as follows. In the conventional smart cache system, when the UE requests a content that is not stored in an EN interworking with the eNB, the content must be received from an origin server via a CN so that the backhaul must be used and a response time also increases so that UX decreases. However, the present invention identifies whether the content is stored in an EN of an adjacent eNB, and when it is identified that the adjacent eNB has the content, enables the EN of the adjacent eNB to transmit the content to the UE so that it has an effect of reducing the backhaul use amount, receiving the content from a closer UE, and improving a UX of the UE. Further, according to the present invention, adjacent ENs may be operated in a form of pooling and allows the adjacent ENs to share a limited storage capacity with each other so that efficient storage utilization can be possible. Accordingly, it has an effect of increasing the storage capacity compared with the storage of each EN.

Effects which can be achieved by interworking a VoLTE service and an SDN-based LTE network are as follows. According to the present invention, a packet can be transferred more quickly to a counterpart UE by setting a transmission path of the conventional VoLTE packet as the minimum path, and as a result, an improvement of the voice quality can be obtained. In addition, according to the present invention, a voice packet is transmitted in a necessary interval only in the backhaul network so that it has an effect of minimizing the impact of congestion that may occur in the backhaul network interval and reducing the backhaul traffic.

Effects which can be achieved by interworking a 1:N Media Sharing service and an SDN-based LTE network are as follows. According to the present invention, in the conventional 1:N video traffic transmission process, a case of repeatedly transmitting the same traffic generated by transmitting data to each reception UE in a unicast transmission does not occur, and the traffic transmission path is formed along the best path so that it has an effect of improving the UX of the reception UE. In particular, according to the present invention, a media relay server equipment which is essential for the conventional 1:N video transmission becomes no longer necessary so that it has an effect of reducing CAPEX.

BRIEF DESCRIPTION OF THE DRAWINGS

FIGS. 6A and 6B are diagrams showing call flows of a UE paging operation according to the present invention;

MODE FOR THE INVENTION

The present invention defines three network architectures for applying SDN to an LTE network.

Figure 1:
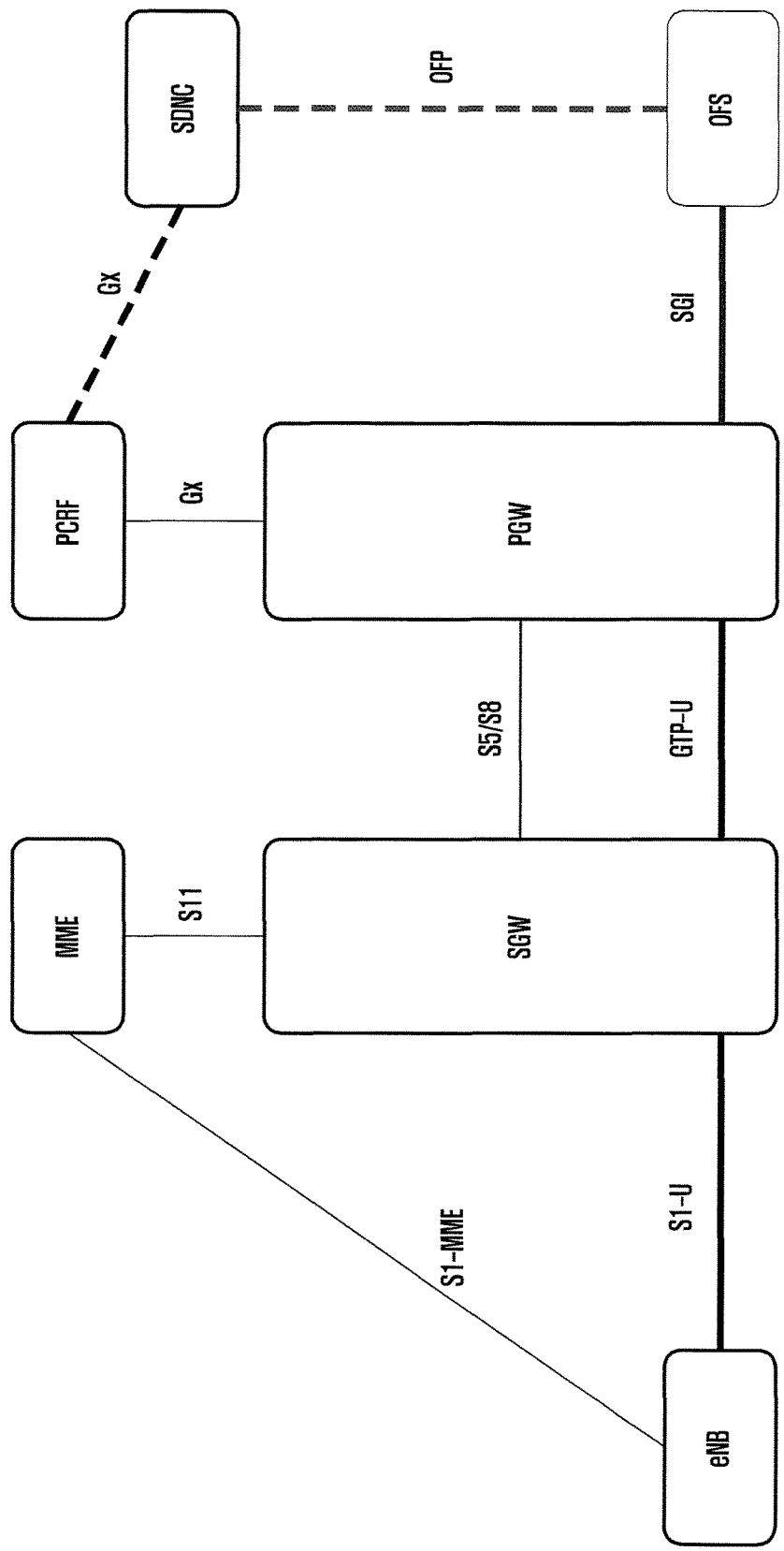
FIG. 1 is a simplified diagram showing an LTE network architecture according to a first embodiment of the present invention.

FIG. 1 is a simplified diagram showing an LTE network architecture according to a first embodiment of the present invention.

The LTE network architecture defined in FIG. 1 is the simplest form and has a structure in which an Openflow switch is additionally installed on top of PGW in the basic structure of an LTE network, and the structure is managed by an SDN controller. Such a structure enables, in a core network, all the traffic not to pass through Deep Packet Inspection (DPI) configuring the core network, a Network Address Translator (NAT), or a Fire Wall (FW), and allows only necessary traffic depending on UEs and traffic characteristics to pass through a corresponding NE so as to increase the resource efficiency and quickly process the traffic at the same time. In the network architecture of FIG. 1, an SDN controller may acquire characteristic information of the traffic by interworking with a PCRF, and accordingly may guarantee QoS depending on the traffic characteristics in the core network as well as in the LTE network. In addition, the SDN controller transmits policy information for processing traffic to the PCRF and enables the PCRF to handle the traffic in accordance with the policy in the LTE network. In addition, through the above process, the SDN controller may apply an end-to-end policy to the traffic.

Figure 2:
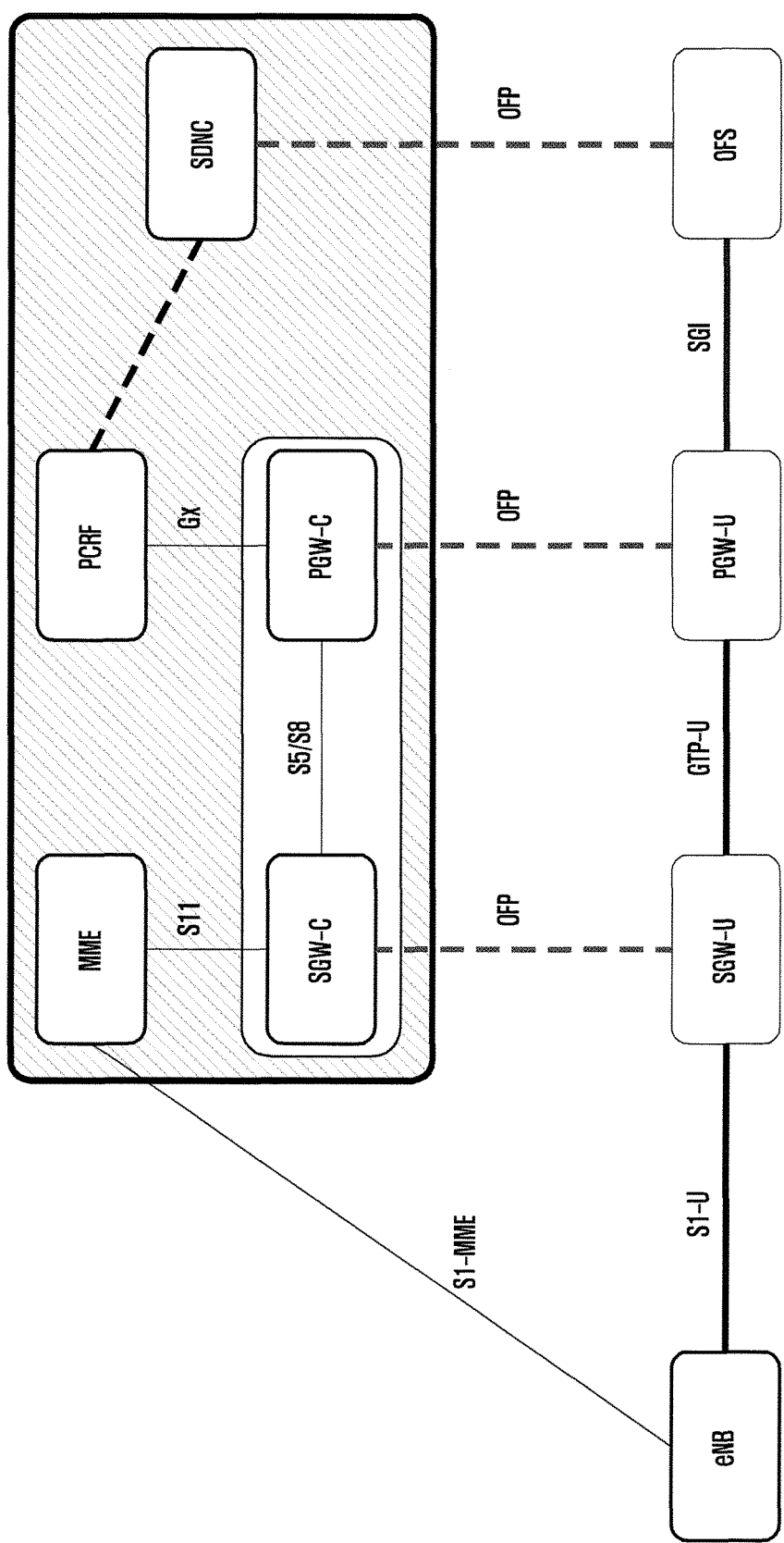
FIG. 2 is a simplified diagram showing an LTE network architecture according to a second embodiment of the present invention.

FIG. 2 is a simplified diagram showing an LTE network architecture according to a second embodiment of the present invention.

The LTE network architecture defined in FIG. 2 is a structure that includes a virtualization of an EPC, separates the control plane and the data plane of the SGW and the PGW, and performs a control between the control plane and data plane using the Openflow protocol. In addition, the LTE network architecture defined in FIG. 2 is, compared to the network structure defined in FIG. 1, a structure that can be applied to a cloud, etc. by virtualizing the control plane of the EPC. In addition, the LTE network architecture defined in FIG. 2 is a structure that may also apply a traffic steering function in the same way as in FIG. 1.

Figure 3:
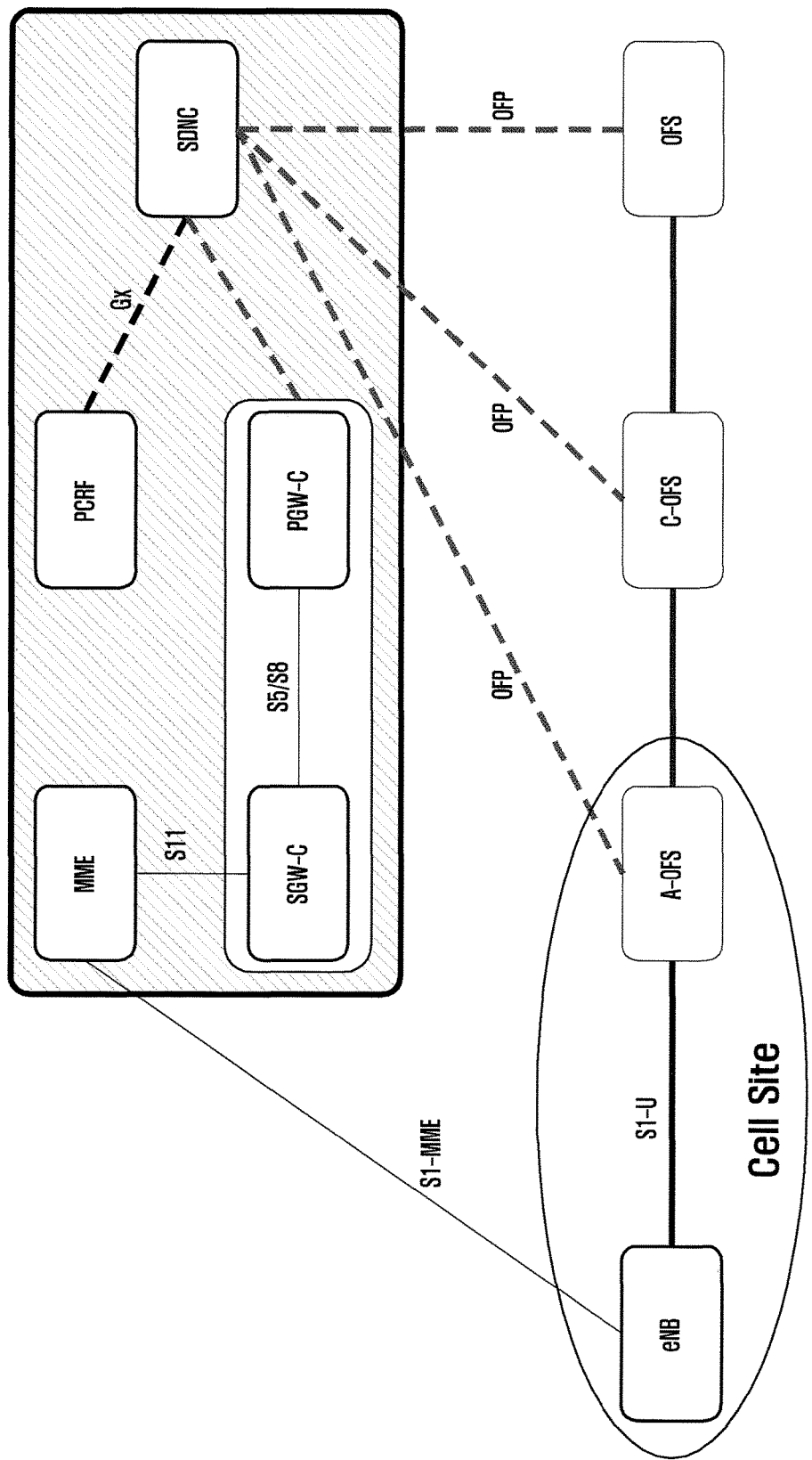
FIG. 3 is a simplified diagram showing an LTE network architecture according to a third embodiment of the present invention.

FIG. 3 is a simplified diagram showing an LTE network architecture according to a third embodiment of the present invention.

The LTE network architecture defined in FIG. 3 is a structure which separates the control planes of the SGW and the PGW to process the function of the data plane by an Openflow switch. To this end, the LTE network architecture of FIG. 3 defines A-OFS and C-OFS and allows an operation such as a GTP tunnel processing in the LTE network. The control function of the SGW and PGW is to forward the necessary information by interworking with the SDN controller, and the SDN controller controls all Openflow switches such that the UE traffic is forwarded properly to the desired destination. The LTE network defined in FIG. 3 is a structure of the most evolved SDN structure, and in the following, various embodiments of the present invention will be described as an example of the LTE network defined in FIG. 3.

An NE to be added in an LTE SDN network according to the present invention includes A-OFS, C-OFS, SDNC, and EPC Control, and their functions are as follows.

Functions of the conventional PCRF and eNB are not changed.

MME performs the conventional function in the same way, and uses an extended conventional S11 interface when interworking with the EPC GW control for additional S-GW relocation and P-GW relocation.

A-OFS is responsible for functions such as bearer setup of the UE and resource allocation, and a flow process in accordance with a PCC-rule. In addition, the A-OFS performs data plane functions of the EPC and configures control information, such as, path setup, based on control information transferred by an SDNC. When an Openflow agent is running, and accordingly a non-configured flow packet is received, the A-OFS reports the reception of the flow packet to the SDNC, acquires the control information of the SDNC, and sets the path of the non-configured flow packet.

C-OFS is a switch that can handle a common Openflow protocol, which acquires forwarding path setup information from the SDNC and performs the path setup based on the forwarding path setup information. In addition, when the UE attached to the non-SDN LTE network is handed over or performs the reverse thereof, the C-OFS may perform a GTP tunnel processing in order to operate as a GTP tunnel anchor of the UE.

SDNC controls and manages Openflow switches. Further, the SDNC acquires mobility information of the UE, GTP session information, etc. by interworking with the GW control function, and sets the forwarding information of the UE packet using the acquired information in the Openflow switch. In addition, if necessary, the SDNC sets the packet forwarding information for traffic steering in the Openflow switch. The SDNC may perform a packet processing specialized for each application in conjunction with an application. To this end, the SDNC provides a northbound API, and if necessary, sets the packet forwarding information in conjunction with the application in the corresponding Openflow switch.

The EPC GW control function corresponds to a function of the control plane of the SGW and PGW and performs a paging request and a packet forwarding function at the time of UE IP address allocation or idle call termination. In addition, the EPC GW control function supports a control function during an Inter-eNB handover and the SGW relocation and processes the Inter-PGW handover. The EPC GW control function forwards, when requested by the SDNC, a UE IP address, IMSI information, eNB IP address information, and GTP tunnel information to the SDNC.

In the following, a call flow for attaching and detaching of the UE, UE handover support, bearer setup, modification, paging, etc. in the SDN-based LTE network will be described, and in such a structure, each of the operations at the time of providing an eNB caching service, a VoLTE service, and a 1:N media sharing service will be described.

Hereinafter, as described above, respective embodiments will be described as an example of the LTE network defined in FIG. 3.

Figure 4:
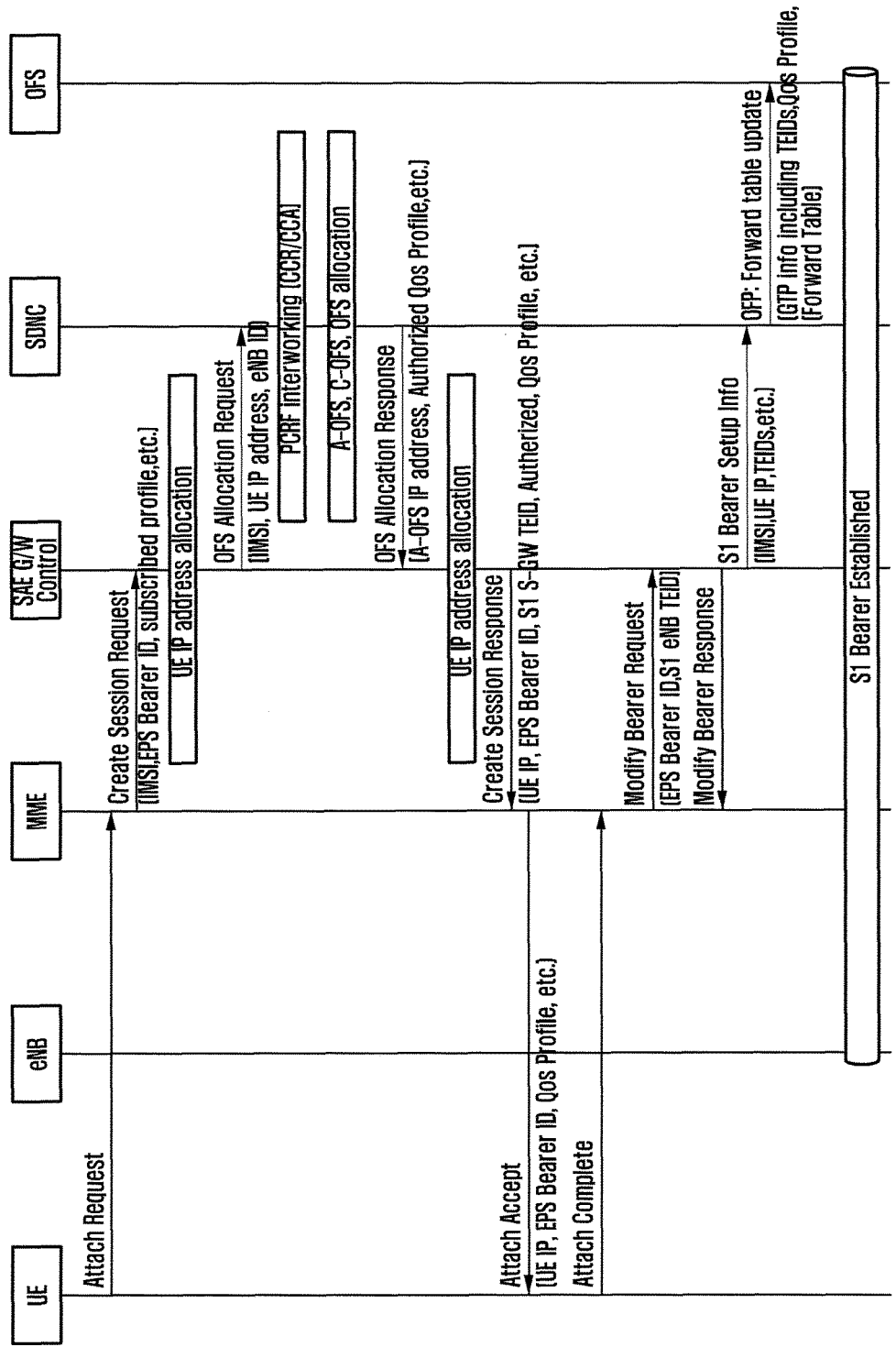
FIG. 4 is a diagram showing a call flow of a UE initial attaching operation according to the present invention.

FIG. 4 is a call flow showing a UE initial attaching operation according to the present invention.

FIG. 4 displays the initial attaching procedure as defined in the standard and a call flow that is newly added according to the present invention.

When a UE is initially accessed, the UE is allocated with an IP address by a SAE GW control function. At this time, the UE's IP address, IMSI information, and IP address information of an eNB which is attached by the UE must be forwarded to the SDN controller. The SDN controller may set a forwarding rule for handling a packet associated with the UE's IP address in the A-OFS connected with eNB based on the information. Therefore, as shown in FIG. 4, the SAE GW control function forwards the information to the SDN controller through an OFS allocation request message. Based on the information, the SDN controller interworks with PCRF, acquires policy information needed to handle the UE traffic, and based on the information, selects the A-OFS and C-OFS to set the forwarding rule of the UE packet, and OFS configuring backbone/backhaul. In addition, the SDN controller forwards the IP address, policy information, etc. of the A-OFS to the SAE GW control through an OFS Allocation response message. Hereinafter, when a TEID allocation process, UE IP address allocation, and a bearer setup process have completed, the SAE GW control function forwards the IMSI information and IP address information of the UE and TEID information to the SDN controller. The SDN controller sets the rule for forwarding the UE packet to the OFSs selected in the previous procedure based on the information. Further, the SDN controller sets a GTP encapsulation/de-capsulation operation based on the TEID information in order to be able to handle the GTP tunnel in the A-OFS connected with the eNB.

Figure 5A:
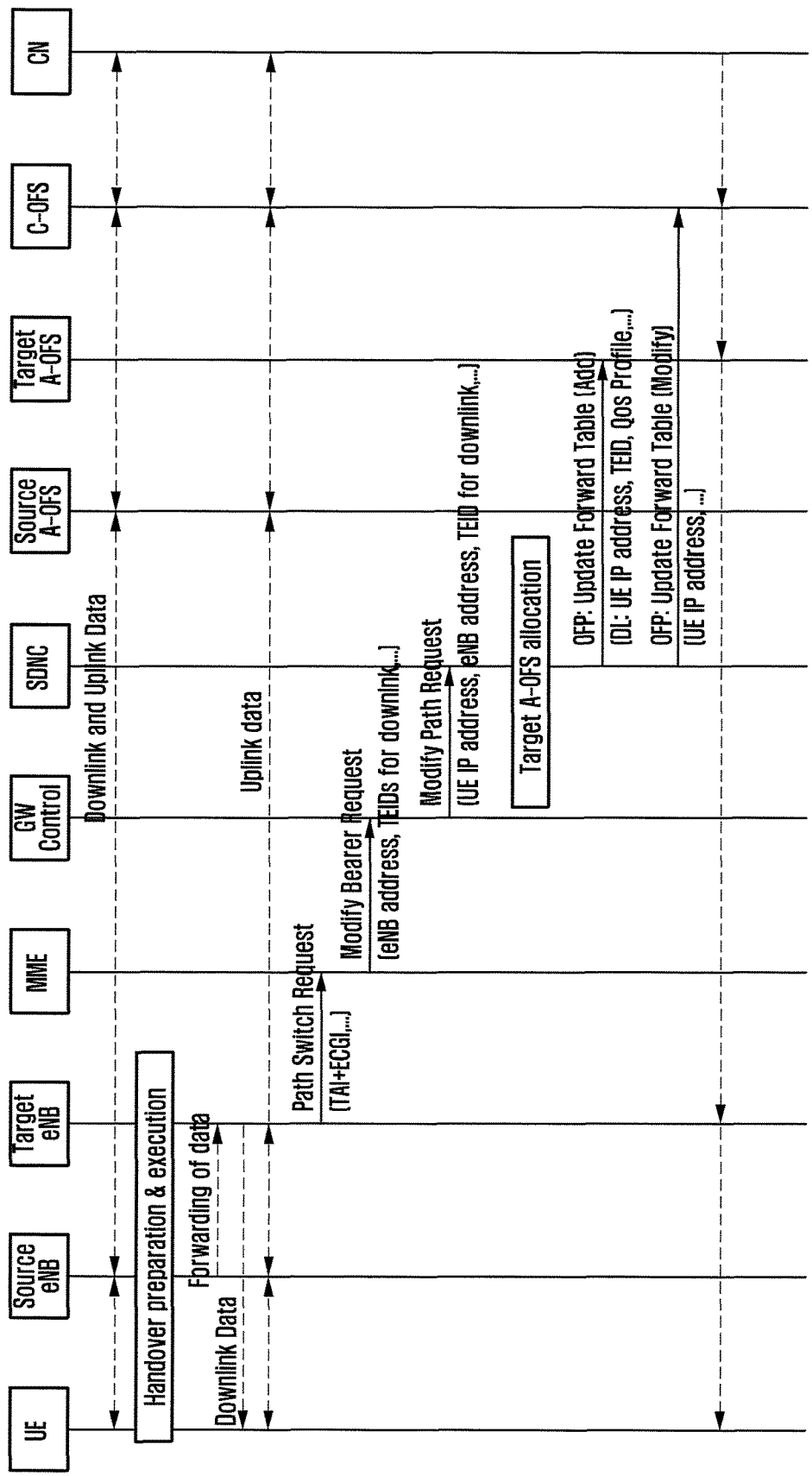
FIGS. 5A and 5B are diagrams showing call flows of an X2-based UE handover operation according to the present invention.
Figure 5B:
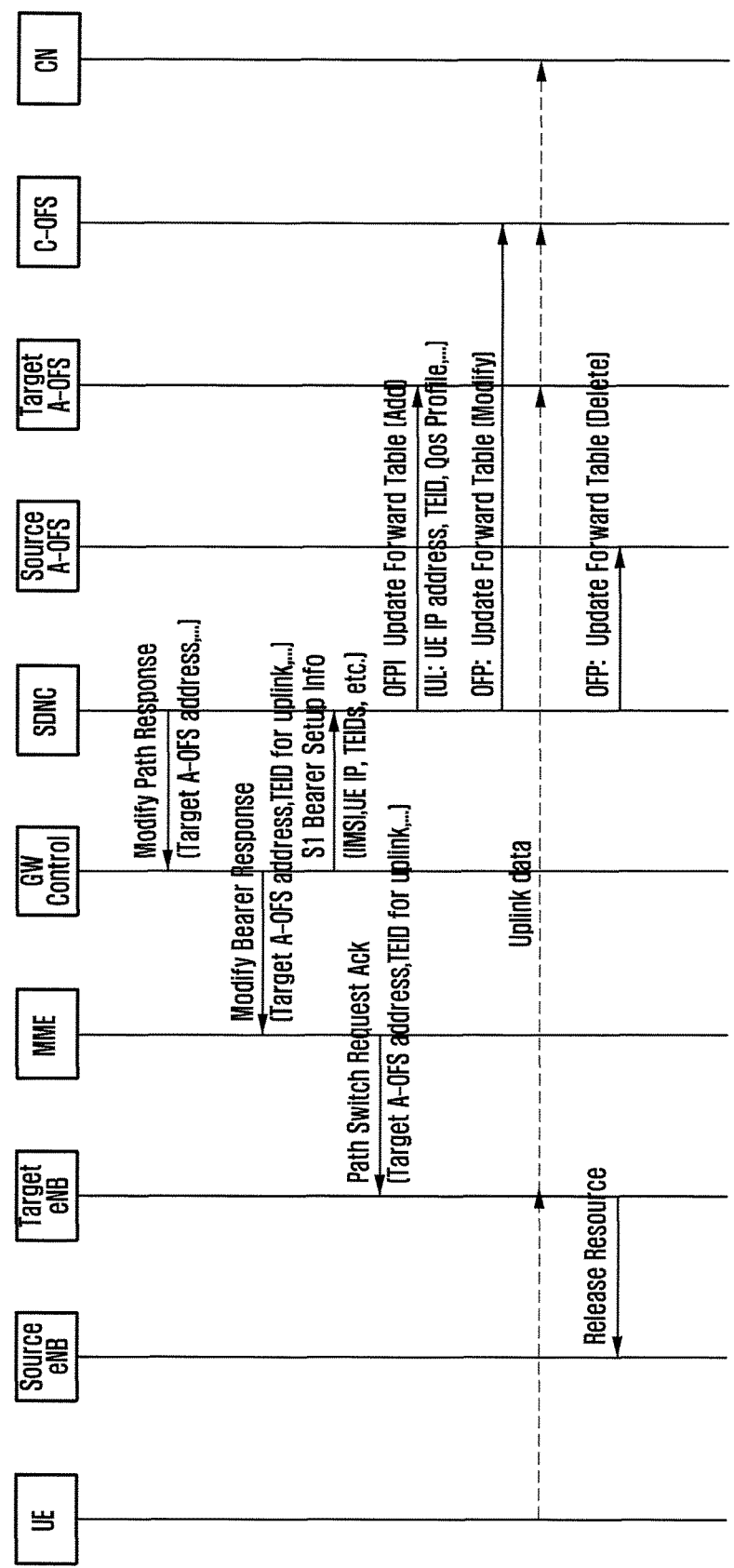

FIGS. 5A and 5B are diagrams showing call flows of an X2-based UE handover operation according to the present invention.

Referring to FIG. 5A, upon receiving a "Modify Bearer Request" from the MME, a GW control function transmits the "Modify Path Request" to the SDNC to notify that DL link TEID is changed. The SDNC selects a new (target) A-OFS based on the DL link change information (an eNB address and TEID for DL) and performs a flow table update including the eNB address and TEID information to the A-OFS selected for transmitting the downlink data. In addition, the SDNC performs a flow table update to the C-OFS so that the corresponding downlink flow can be transmitted to the target A-OFS for the downlink data transmission. At this time, the SDNC may choose a new C-OFS depending on the network topology. Since then, the downlink data traffic is passed through the C-OFS→target A-OFS→target eNB.

Then, referring to FIG. 5B, the SDNC notifies of the target A-OFS address information to the GW control function. The GW control function allocates the target A-OFS and new TEID for UL and then notifies of the allocated target A-OFS and new TEID for UL to the MME (Modify Bearer Response). Further, the GW control function notifies of the allocated TEID for UL information to the SDNC in order to apply a flow to the UL data flow and the SDNC performs a flow table update for the UL data to the target A-OFS and C-OFS. From this time, the Uplink Data traffic passes through the target eNB→target A-OFS→C-OFS. After which, the SDNC performs corresponding UL and DL flow entry deletion of the source A-OFS to complete X2-based UE handover process.

FIGS. 6A and 6B are diagrams showing call flows of UE paging operation according to the present invention.

Referring to FIG. 6A, upon receiving a notification of the transition to the UE idle state from the MME, the GW control function notifies of the relevant information to the SDNC. Further, the GW control function requests a setup for forwarding the DL data to the GW control function with respect to the corresponding UE IP address (Modify path Request).

Upon receiving a setup request, the SDNC sets the C-OFS to forward the DL flow to the GW control function (OFP: Update Forward Table (Modify)). Further, as an optional process, the SDNC may request the A-OFS to delete the UL and DL flow entries. At this time, from the standard, when the TAU of the idle UE is executed, the SGW relocation can be executed. In this case, the new C-OFS can be allocated depending on the network topology.

When an incoming packet is terminated by the UE being in the idle state, the C-OFS forwards the packet to the GW control function and the GW control function transmits a "Downlink data Notification" to the MME when the incoming packet is received. Upon receiving the notification, the MME performs a paging request to the eNBs and performs an NAS setup with the eNB which has received a response from the UE.

After which, the MME requests the GW control function for the SGW address and TEID allocation (TEID request) before transmitting the SGW address for UL traffic and TEID for UL. In the standard, MME is adapted to forward previously known information to the eNB without interworking with the SGW, but in the network structure of the present invention, when the UE has been moved from the idle state, the A-OFS performing the role of the SGW may be changed so that the MME acquires the relevant information through the SDNC.

Upon receiving the request from the MME, the GW control function requests the SDNC for A-OFS allocation and notifies of an A-OFS address received from the SDNC and the allocated TEID for UL to the MME (OFS allocation response and TEID response).

The MME transmits "SI-AP: Initial Context Setup Request" including the received A-OFS (corresponding to the SGW) address and TEID information to the eNB.

At this time, the GW control function notifies of the S1 bearer setup information including the allocated TEID for UL information to the SDNC.

Hereinafter, referring to FIG. 6B, the SDNC performs a forward table update (or also referred to as "flow table update") including a UE IP address and TEID for UL information to the A-OFS. Further, the SDNC selects the C-OFS and performs a flow table update.

Hereinafter, when receiving the "Modify Bearer Request" from the MME, the GW control function notifies S1 Bearer Setup information including the eNB address and TEID for DL to the SDNC, and the SDNC performs a forward table update to the A-OFS (or also be referred to as "a flow table update") for downlink data flow.

Figure 7:
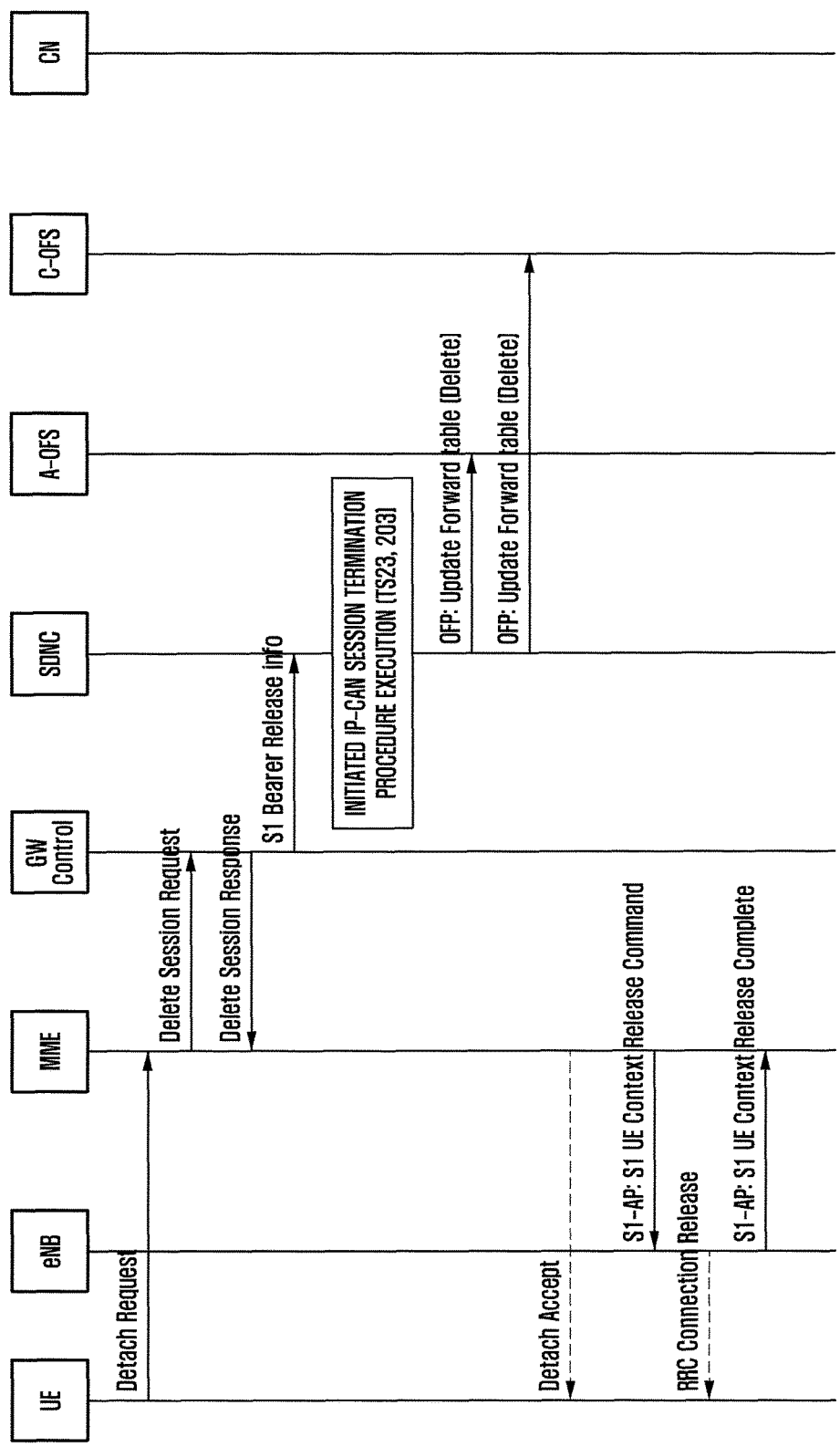
FIG. 7 is a diagram showing a call flow of a UE detaching operation according to the present invention.

FIG. 7 is a diagram showing a call flow of a UE detaching operation according to the present invention.

When the UE transmits a detach request message to a MME, the MME transmits a Delete Session Request to a GW control function. Upon receiving the Delete Session Request, the GW control function transmits a response to the MME and then transmits the S1 bearer release information to the SDNC. Upon receiving the S1 bearer release information, the SDNC performs a PCEF initiated IP-CAN session termination procedure as defined in TS23.203. Then, the SDNC transmits a forward table delete command to the A-OFS, C-OFS, and if necessary, other OFSs (OFP: Update Forward Table (Delete)). Upon receiving the command, the OFS deletes the corresponding flow table entry.

Figure 8:
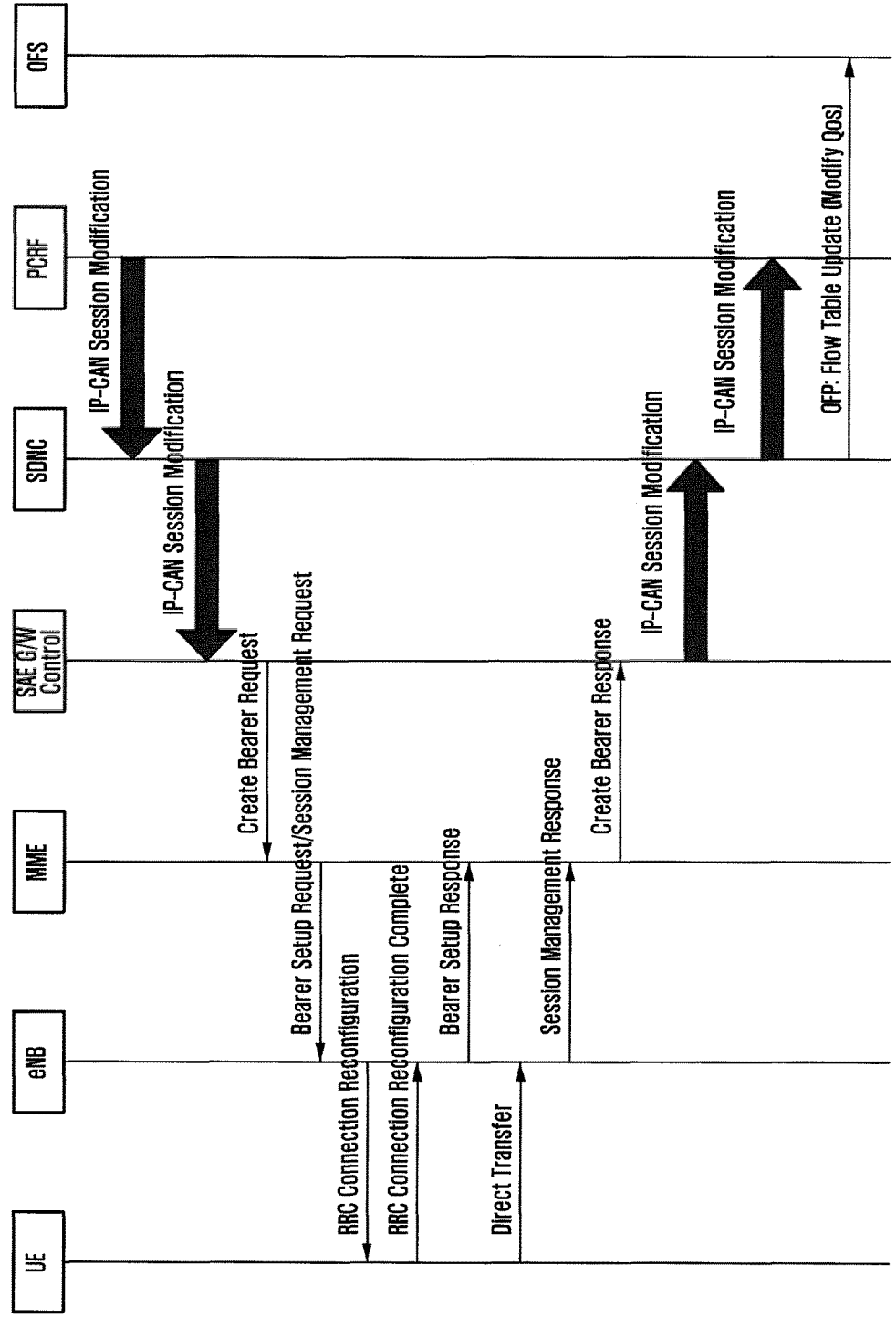
FIG. 8 is a diagram showing a call flow of a dedicated bearer activation operation according to the present invention.

FIG. 8 is a diagram showing a call flow of a dedicated bearer activation operation according to the present invention.

The basic process of the dedicated bearer activation operation is performed in the same manner as the contents of the conventional standard. However, in an embodiment of the present invention, in order to be able to transmit the corresponding traffic when the bearer is activated, the SDNC enables the OFSs to handle the traffic appropriately for the QoS through the flow table update command (OFP: Flow Table Update (Modify QoS)).

In the call flow shown in FIG. 8, communication between the PCRF and the GW control function will be established through the SDNC. This is because the GW control function is interworked via the SDNC in the present invention, unlike the PCRF and the GW control function in the conventional network are directly interworked as described in the network architecture of FIG. 3.

Figure 9:
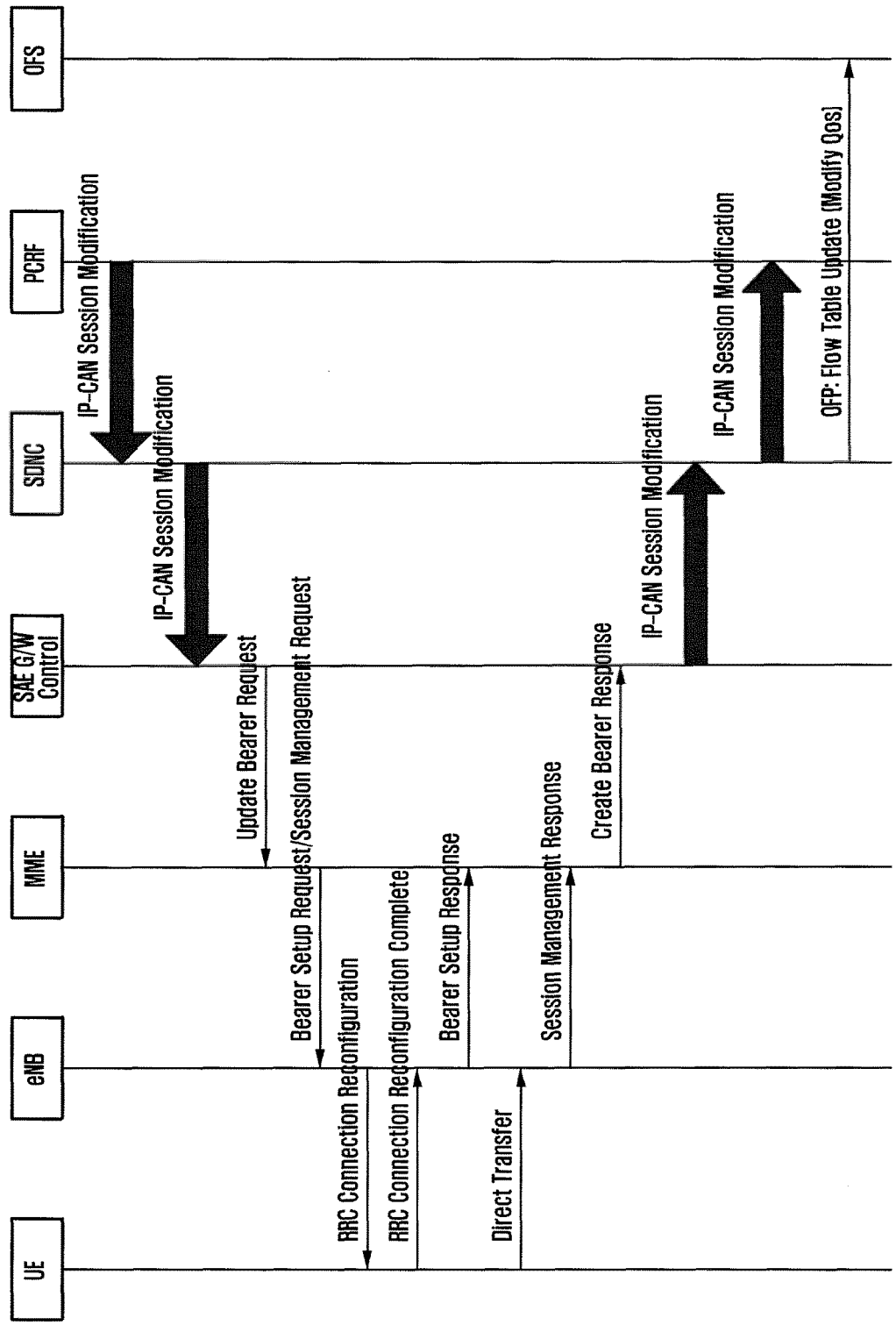
FIG. 9 is a diagram showing a call flow of a bearer modification operation according to the present invention.

FIG. 9 is a diagram showing a call flow of a bearer modification operation according to the present invention.

The bearer modification procedure is also made similarly to the bearer setup procedure, and finally the SDNC transmits QoS change information to the corresponding OFSs so that the packet can be processed according to the modified QoS information (OFP: Flow Table Update (Modify QoS)).

Figure 10A:
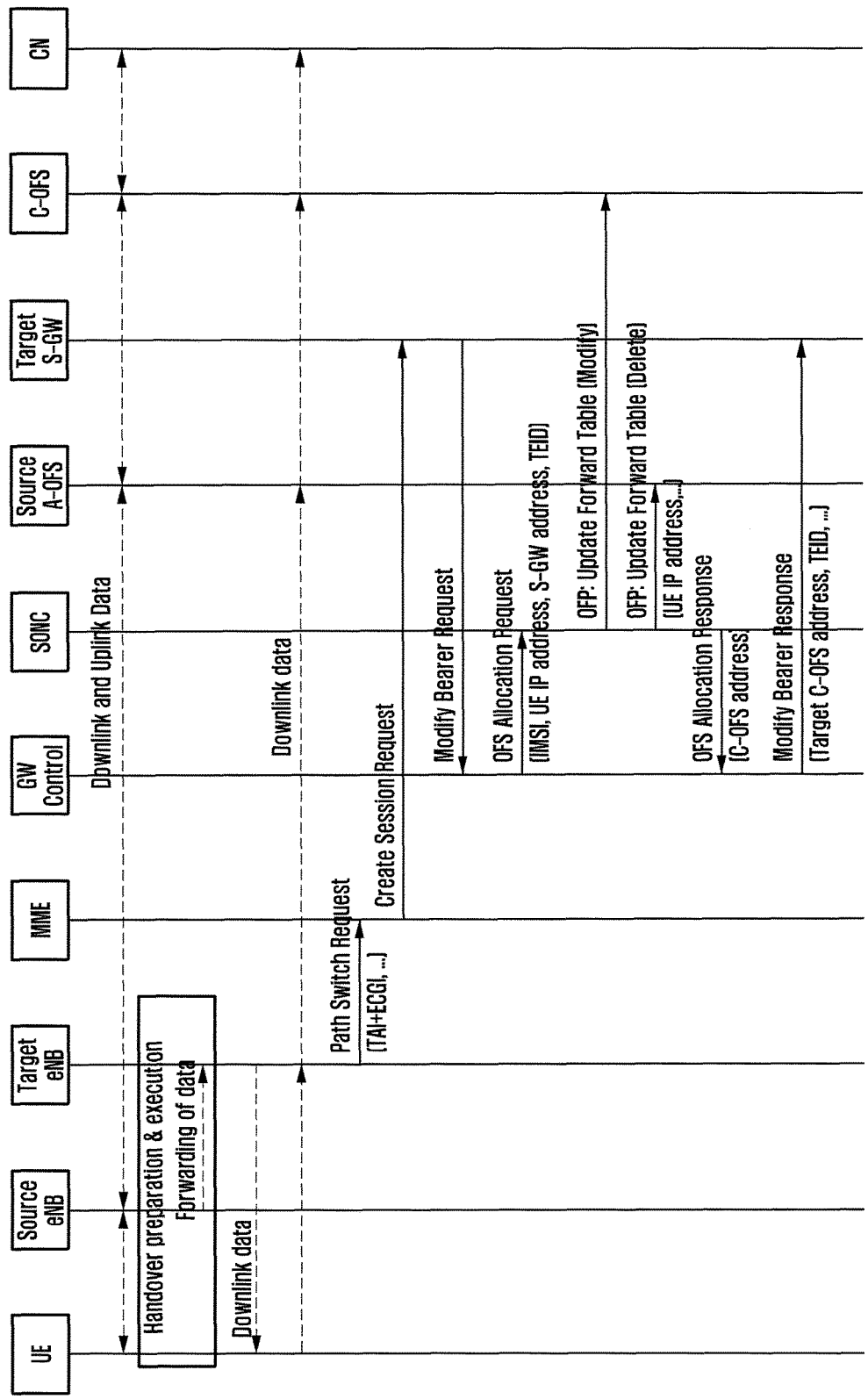
FIGS. 10A and 10B are diagrams showing call flows of an X2-based handover operation in a case where a UE performs a handover from an SDN-based LTE network to the conventional LTE network according to the present invention.
Figure 10B:
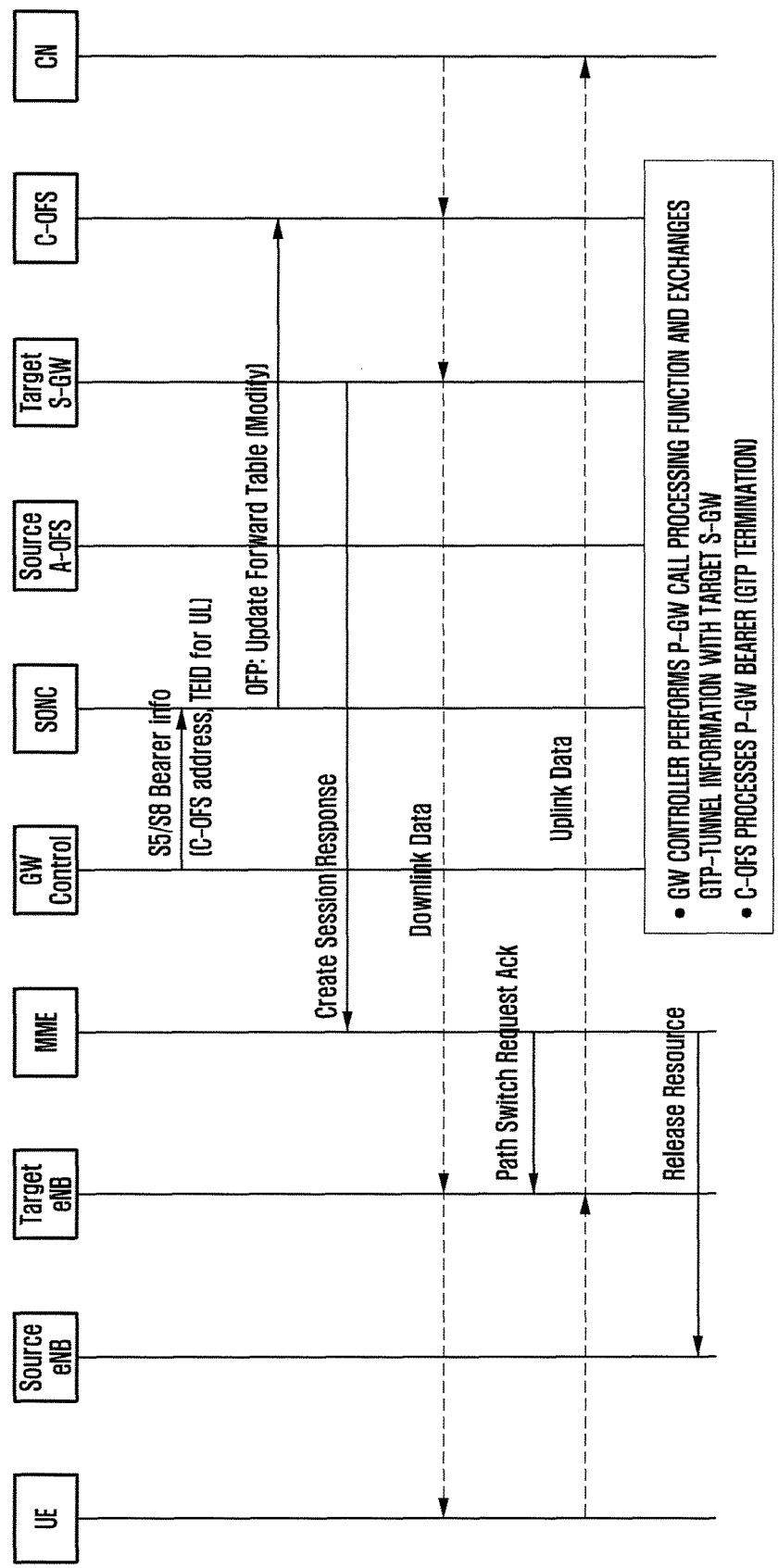

FIGS. 10A and 10B are diagrams showing a call flow of an X2-based handover operation in a case where a UE performs a handover from an SDN-based LTE network to the conventional LTE network according to the present invention.

In the handover procedure shown in FIGS. 10A and 10B, a GW control function which communicates with a target SGW for a handover operates as a PGW Controller.

First, referring to FIG. 10A, upon receiving the "Modify Bearer Request" from the target SGW, the GW control function requests the SDNC for a C-OFS allocation for the GW control function to be operated as the PGW bearer (OFS Allocation Request). At this time, the "OFS Allocation Request" may include a target SGW address and TEID for DL information.

Upon receiving the OFS Allocation Request, the SDNC selects a suitable C-OFS (which may be the conventional C-OFS) and responds with the C-OFS address information. Further, the SDNC performs the flow table update of the selected C-OFS including the target SGW address and TEID information received from the GW control function (OFP: Update Forward Table (Modify)). Accordingly, the downlink data traffic is transmitted, from the CN, through the C-OFS→Target S-GW→target eNB, to the UE.

The GW control function allocates the TEID for UL (S5/S8) and responds to the target SGW with the "Modify Bearer Response" after including the allocated information. In addition, referring to FIG. 10, the GW control function notifies of C-OFS address and TEID information to the SDNC in order to set the Uplink data path (S5/S8 bearer Info). Upon receiving the C-OFS address and TEID information, the SDNC performs a flow table update for uplink data path to the C-OFS (OFP: Update Forward Table (Modify)). Accordingly, the Uplink data traffic is transmitted from the UE, via the target eNB→Target SGW→C-OFS, to the CN.

Figure 12A:
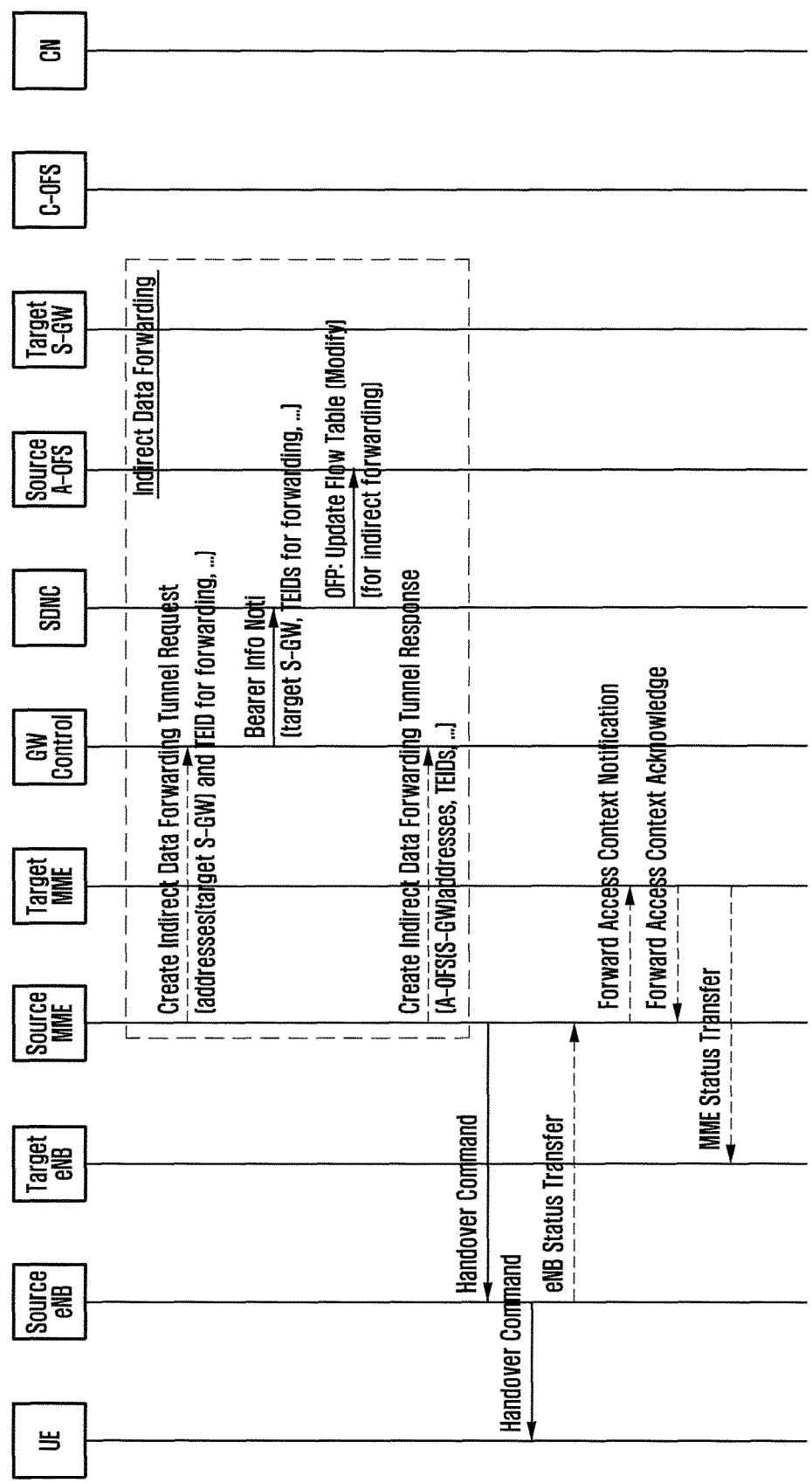
Figure 12B:
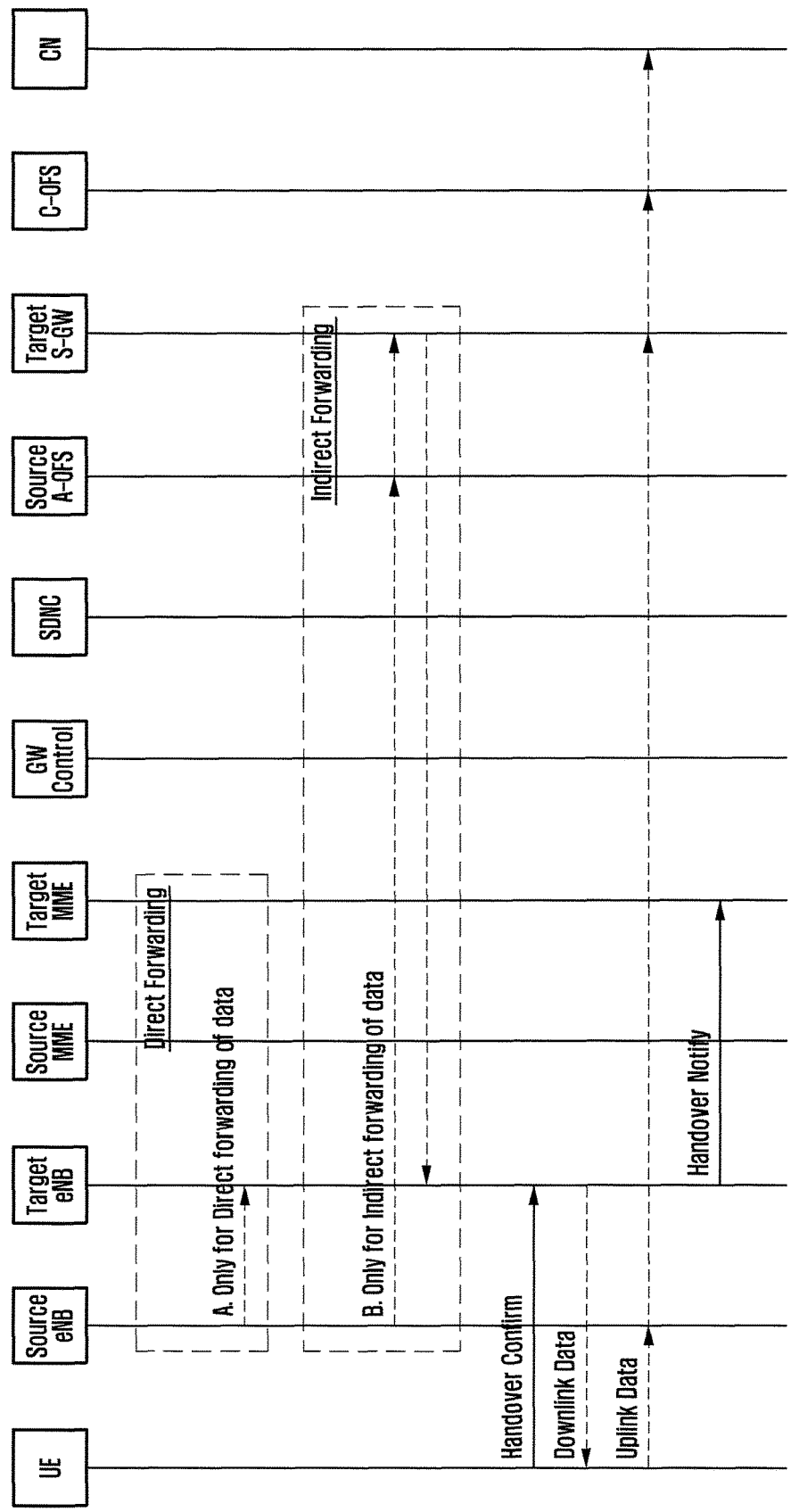
Figure 13:
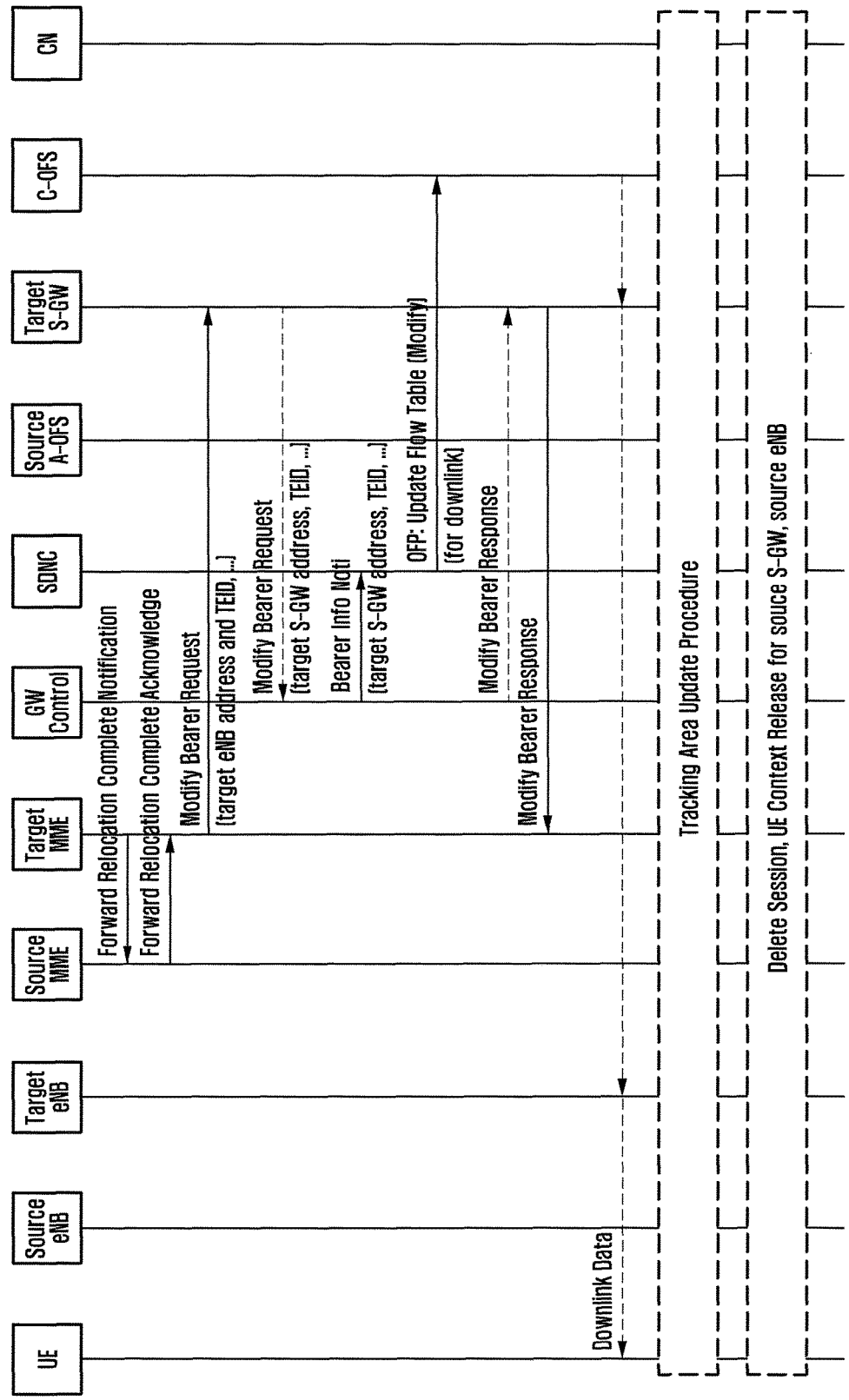

FIGS. 11 to 13 are diagrams showing call flows of an S1-based handover operation in a case where a UE performs a handover from an SDN-based LTE network to the conventional LTE network according to the present invention.

Figure 11A:
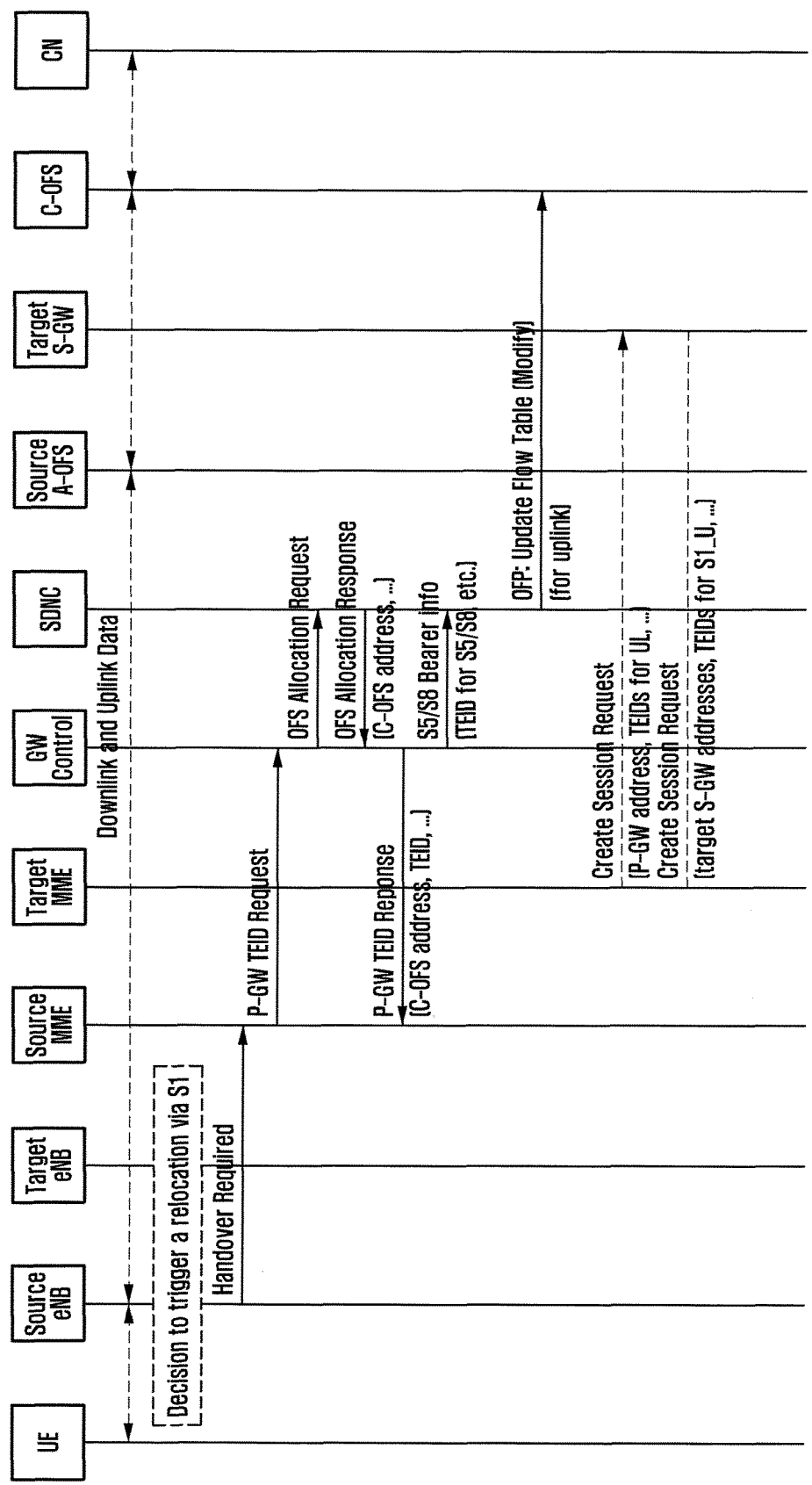
FIGS. 11 to 13 are diagrams showing call flows of an S1-based handover operation in a case where a UE performs a handover from an SDN-based LTE network to the conventional LTE network according to the present invention.

First, referring to FIG. 11A, upon receiving "Handover Required" message from a source eNB, a source MME requests a GW control function for PGW address and TEID, before transmitting a "Forward Relocation Request" message to a target MME (P-GW TEID request). (The PGW address and TEID must be transferred to the target MME.) Upon receiving the request, the GW control function requests the SDNC for the allocation of the C-OFS for performing the PGW function (OFS allocation request). The SDNC selects a C-OFS for performing the PGW functions in response to the GW control function with the C-OFS address (OFS allocation response), and the GW control function responds to the source MME (P-GW TEID response) with the TEID for UL and C-OFS (PGW) address.

In addition, the GW control function notifies of the UE IP address, C-OFS address, and TEID (S5/S8) to the SDNC in order to set the uplink traffic path (S5/S8 Bearer Info.). The SDNC performs a flow table update of the C-OFS including the UE IP address, the PGW address, and the TEID information to set the uplink data path (OFP: Update Flow Table (Modify)). At this time, the C-OFS also performs processing for the uplink data received from the existing source A-OFS.

Figure 11B:
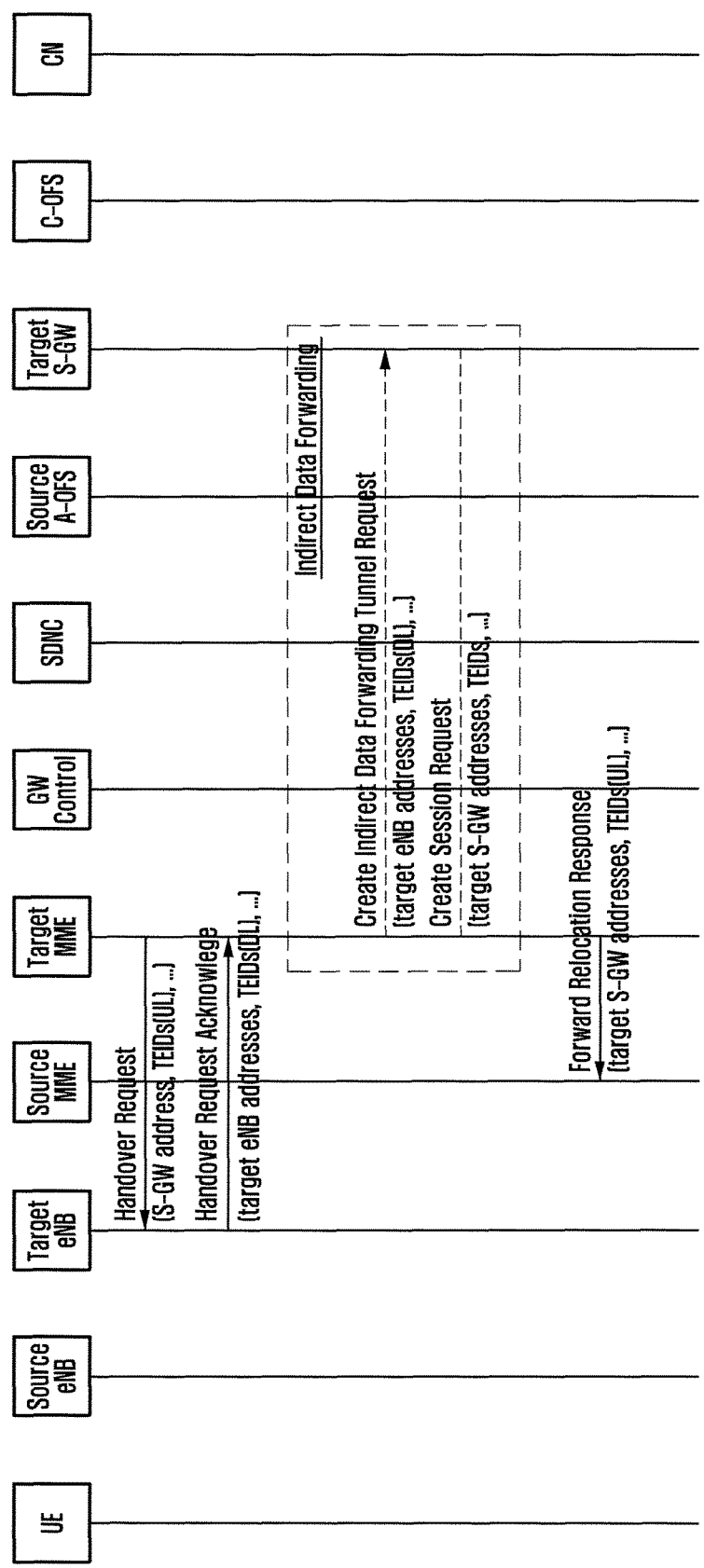

Then, referring to FIG. 11B, the handover procedure between a target MME and a target eNB is performed, and the target MME and a target serving gateway may perform indirect data forwarding.

Next, referring to FIG. 12A, in a case of the indirect data forwarding, a source MME transmits a "create indirect data forwarding request" to a GW control function. The request message includes a target SGW address and TEID. Upon receiving the message, the GW control function transmits indirect tunneling to the SDNC (Bearer Info Noti), and the SDNC performs source A-OFS flow table update for the tunneling (OFP: Update Flow Table (Modify)), based on information received from the GW control function. Accordingly, referring to FIG. 12B, a data forwarding path is configured by the source eNB→source A-OFS→Target SGW→target eNB.

After the handover notification has been transmitted from the target eNB to the target MME, as shown in FIG. 13, a target SGW transmits a "Modify Bearer Request" including a target S-GW address and TEID information to the GW control function (a role of the PGW). Upon receiving the Modify Bearer Request, the GW control function transmits S5/S8 Tunnel information to the SDNC (Bearer Info Noti) in order to configure the Downlink data path and enables the SDNC to perform the flow table update of the C-OFS (P-GW role) (OFP: Update Flow Table (Modify)). Accordingly, the downlink data is transmitted to the C-OFS→Target SGW→Target eNB. After performing the handover, the C-OFS performs IP anchoring for the UE which is handed over using a non-SDN network, and performs a legacy SGW and a S5/S8 Tunneling.

Figure 14A:
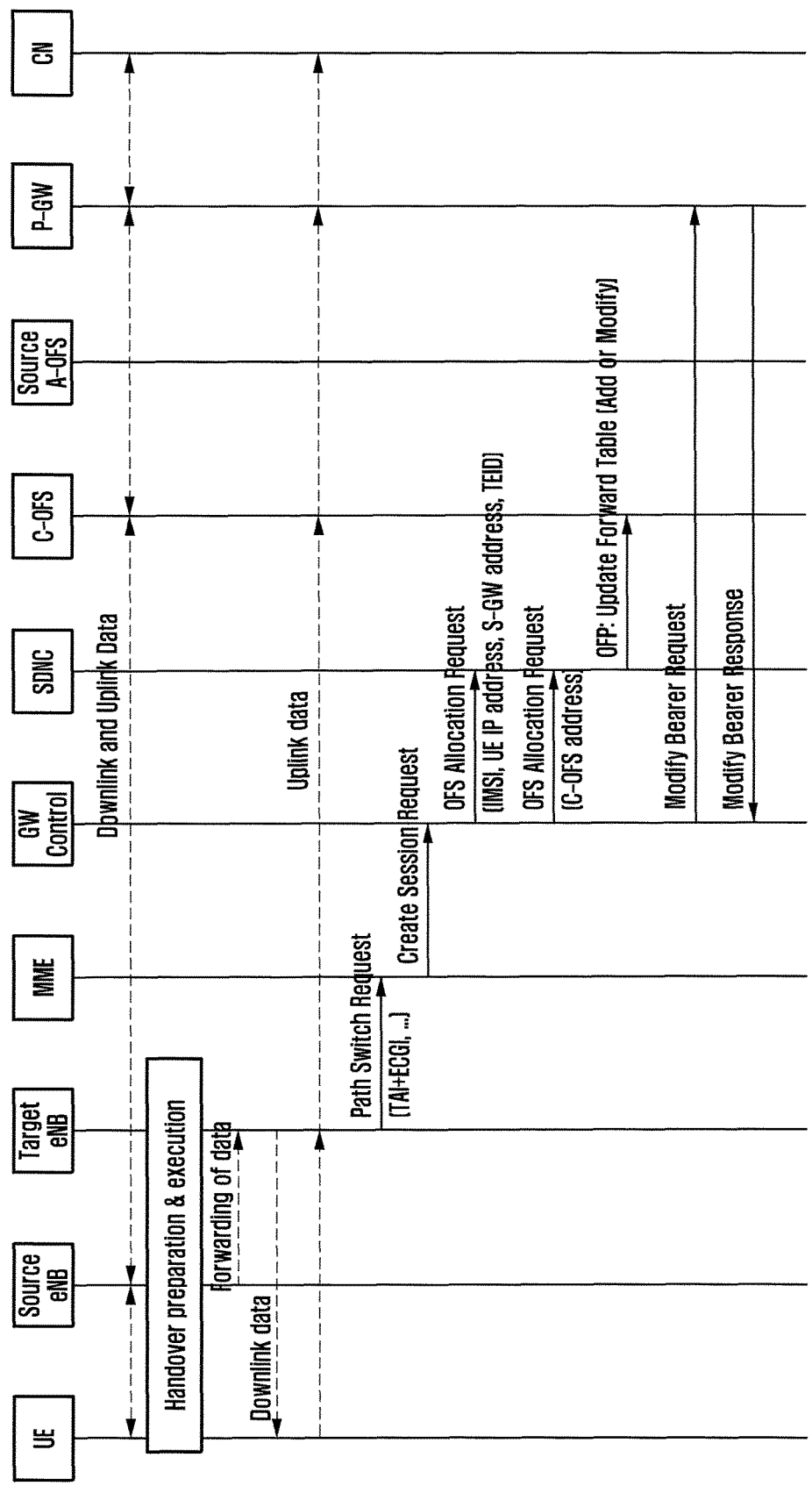
FIGS. 14A and 14B are diagrams showing call flows of an X2-based handover operation in a case where a UE performs a handover from the conventional existing LTE network to an SDN-based LTE network according to the present invention.
Figure 14B:
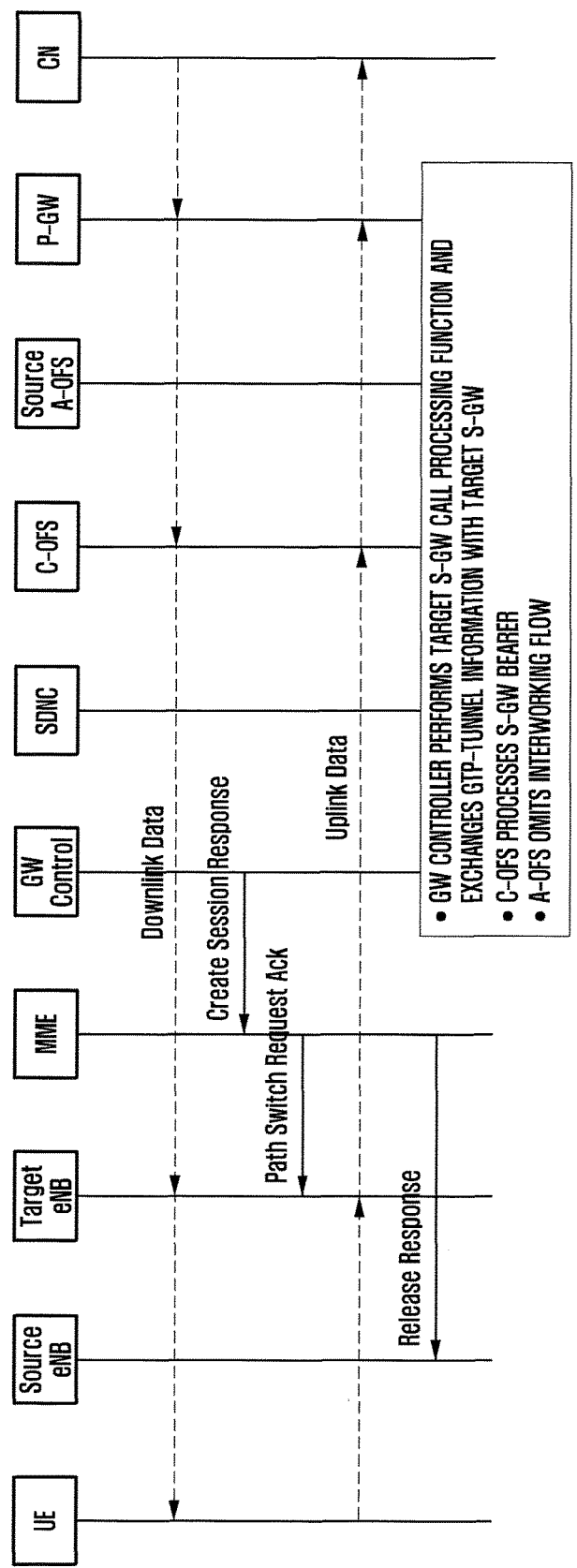

FIGS. 14A and 14B are diagrams showing call flows of an X2-based handover operation in a case where a UE performs a handover from the conventional LTE network to an SDN-based LTE network according to the present invention.

Referring to FIG. 14A, upon receiving a session create request after the UE handover, a GW control function requests the SDNC for allocation of the C-OFS to perform an SGW role (OFS allocation request), and transmits the UE IMSI, IP address, the SGW address, and TEID information. The SDNC allocates the C-OFS and then forwards an IP address to the GW control function (OFS Allocation Response), and transmits a flow table update command for performing the SGW function to the C-OFS to allow the C-OFS to process the UE packet (OFP: Update Forward Table (add or modify)). Since the C-OFS operates as the SGW, the A-OFS does not perform a GTP encapsulation/ de-capsulation function for the UE packet, and accordingly, referring to FIG. 14B, the A-OFS only bypasses the UE packet.

Figure 15:
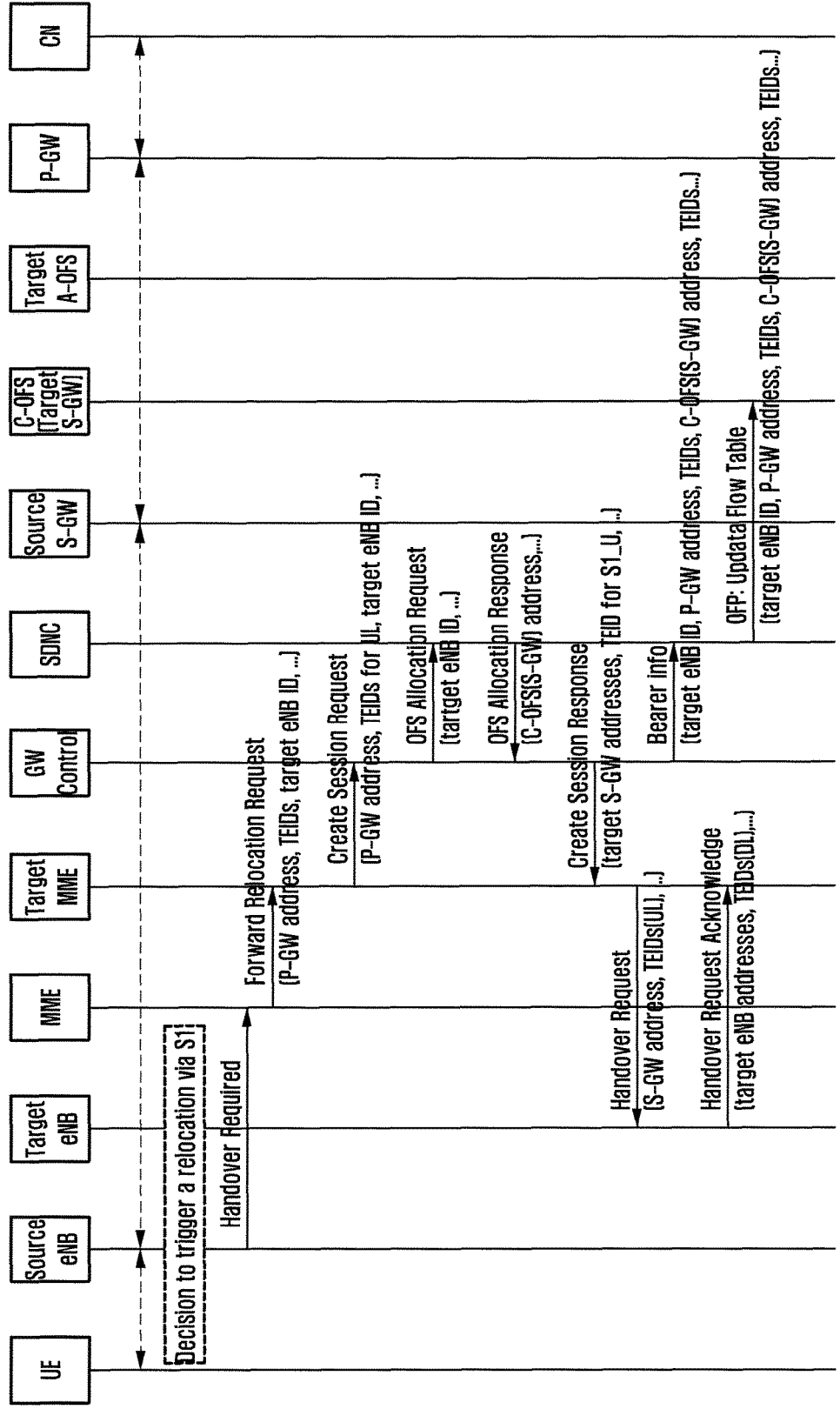
FIGS. 15 to 17 are diagrams showing call flows of an S1-based handover operation in a case where a UE performs a handover from the conventional LTE network to an SDN-based LTE network according to the present invention.
Figure 16:
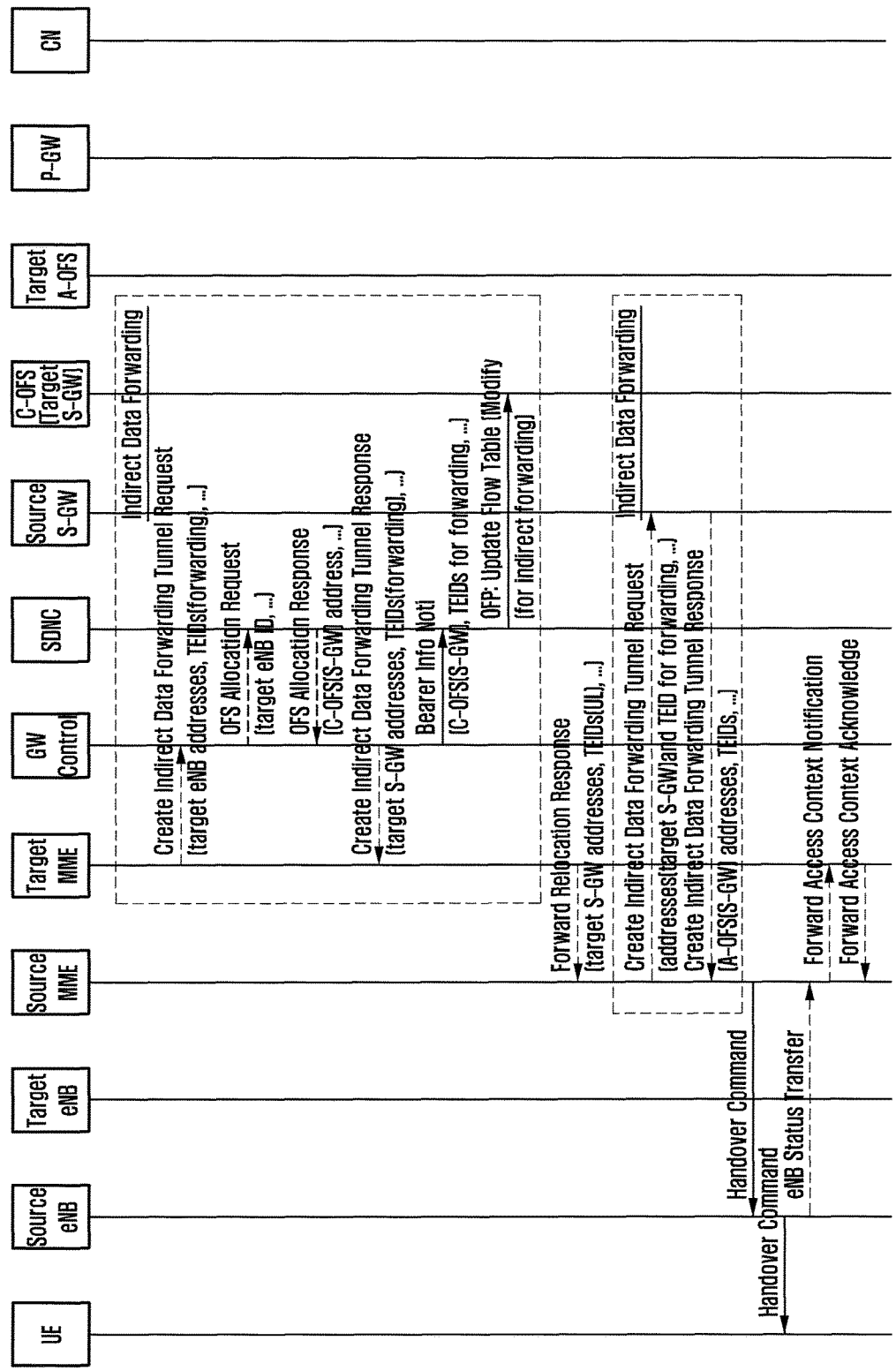

FIGS. 15 to 17 are diagrams showing call flows of an S1-based handover operation in a case where a UE performs a handover from the conventional LTE network to an SDN-based LTE network according to the present invention.

First, referring to FIG. 15, a GW control function receives a "Create Session Request" from the target MME and requests the SDNC for a C-OFS allocation request to perform the role as the target SGW (OFS Allocation Request). The SDNC which has received the request appropriately allocates the C-OFS and then responds with a C-OFS address (OFS Allocation Response).

The GW control allocates TEID to be used for a S1-U and responses to a target MME (create session response).

Then, the GW control function notifies of the S1-U Bearer Information to the SDNC. The SDNC performs the flow table update of the C-OFS and target A-OFS (corresponding to target eNB) to allow the processing of the UE packet (OFP: Update Flow Table). To this end, the SDNC transmits the GTP tunnel information to the C-OFS and transmits the GTP bypass information to the A-OFS. Then, the C-OFS may receive uplink data to transmit the data to the PGW (performs the target S-GW role).

Next, referring to FIG. 16, in a case of operating as an indirect data forwarding mode, a MME transmits a "create indirect data forwarding tunnel request" to a GW control function. Upon receiving the request, the GW control function performs a request for allocating the C-OFS to the SDNC for forwarding (OFS Allocation Request). The process corresponds to an optional process, and the GW control function may use the conventionally received C-OFS address without performing the C-OFS allocation request.

After receiving the C-OFS allocation, the GW Control function creates TEID for forwarding and then gives a response to the target MME (create indirect data forwarding tunnel response), and notifies of the tunnel information for forwarding to the SDNC (Bearer Info Noti.). Upon receiving the information, the SDNC performs a C-OFS flow table update using the information (OFP: Update Flow Table (Modify)).

Figure 17B:
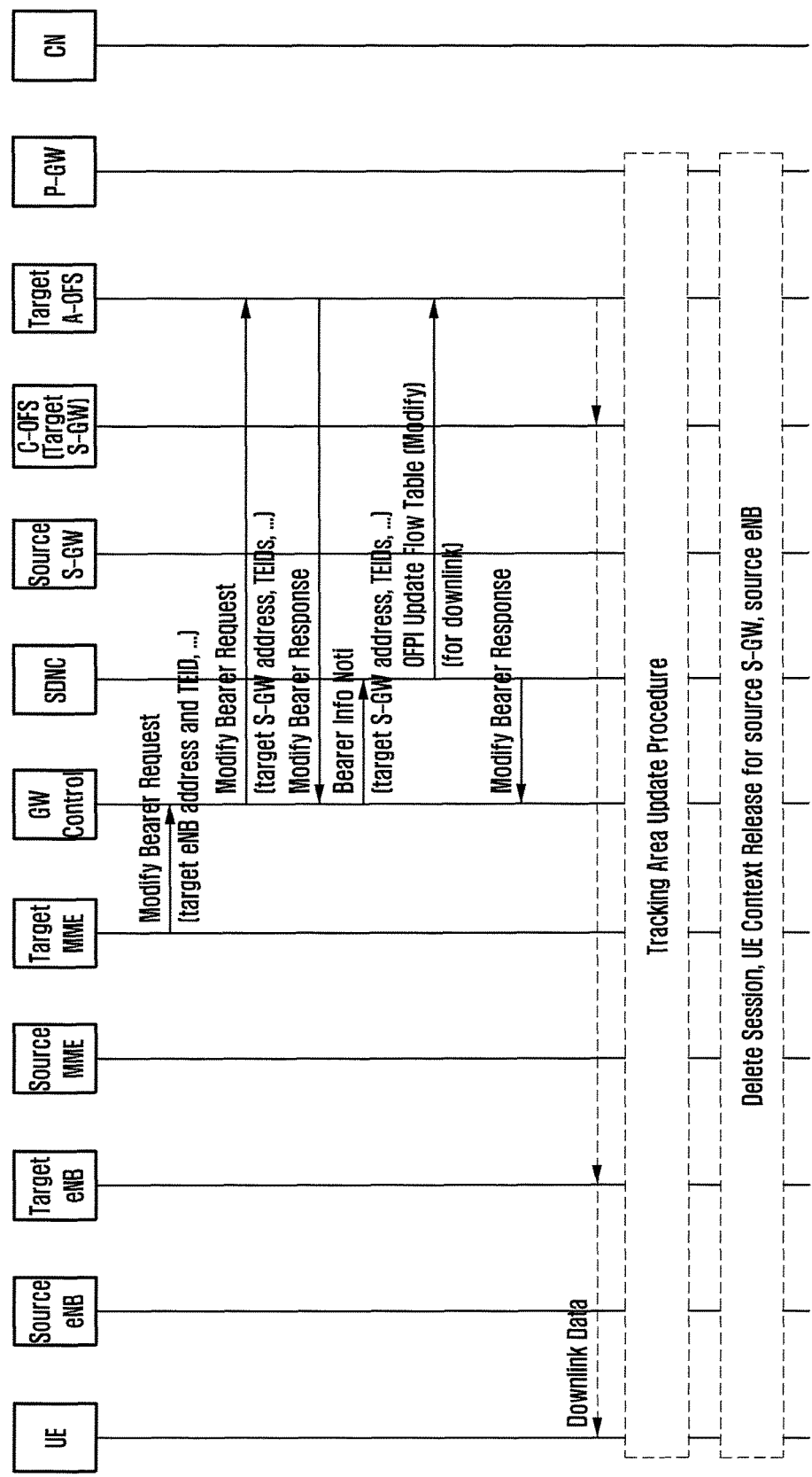

Then, referring to FIG. 17A, the C-OFS may transmit downlink data to the target eNB after receiving downlink data forwarded from the Source SGW. Referring to FIG. 17B, upon receiving a "Handover Notify" message from the target eNB, a target MME transmits a "Modify Bearer Request" message to a GW Control function and the GW Control function exchanges the modify bearer message with the PGW. After completing the modify bearer process, the GW Control function transmits the bearer exchange information with the PGW to the SDNC (Bearer Info Noti.). Upon receiving the information, the SDNC performs A-OFS and C-OFS flow table updates based on the information (OFP: Update Flow Table (Modify)). At this time, the A-OFS operates as a GTP bypass mode and the C-OFS performs GTP Tunneling with a target eNB and PGW, respectively. Then, the downlink data is transmitted to PGW→C-OFS (target S-GW)→target eNB. At this time, the A-OFS may perform the GTP processing (de-capsulation/encapsulation) for transmitting an edge app through the control of the SDNC while operating as a switch.

The description above has defined a process of call flows necessary for a basic operation in an SDN based LTE network. Hereinafter, operations of the SDN-based LTE network defined in the present invention in providing a cache service, a VoLTE service, and a 1:N media sharing service by the eNB will be described with reference to the drawings.

First, there will be described an embodiment which interworks with the eNB cache service. When interworking with the eNB cache, the SDNC may receive the relevant information in conjunction with a smart cache manager, and at this time, the smart cache manager operates as an application that uses a northbound API from the SDNC standpoint. Functions of the DPI required along with the function of the smart cache manager are as follows:

A smart cache manager interworks with CN, and acquires and manages the content information stored in each EN. The content which is the subject of the present invention corresponds to the content preloaded by the CP and this information is stored/managed in the CN according to the operation of the smart cache. Thus, the smart cache manager acquires this information, manages the actual content, the URL, and the stored address information of the EN, identifies whether the content corresponding to a URL requested by the UE is stored in what EN, and transmits the result to the SDNC.

DPI plays the same role as that performed by a general DPI, and performs additional functions as required by the present invention. That is, the content to which the present invention is applied may be a large volume of media files, the content being preloaded by the CP. The DPI analyzes the HTTP request message requested by the UE, determines whether the requested content is the content preloaded by the CP, and performs a role of informing of a result of the determination to the smart cache manager.

Hereinafter, based on the foregoing descriptions, an embodiment related to an interworking process with the smart cache will be described in detail.

Figure 18:
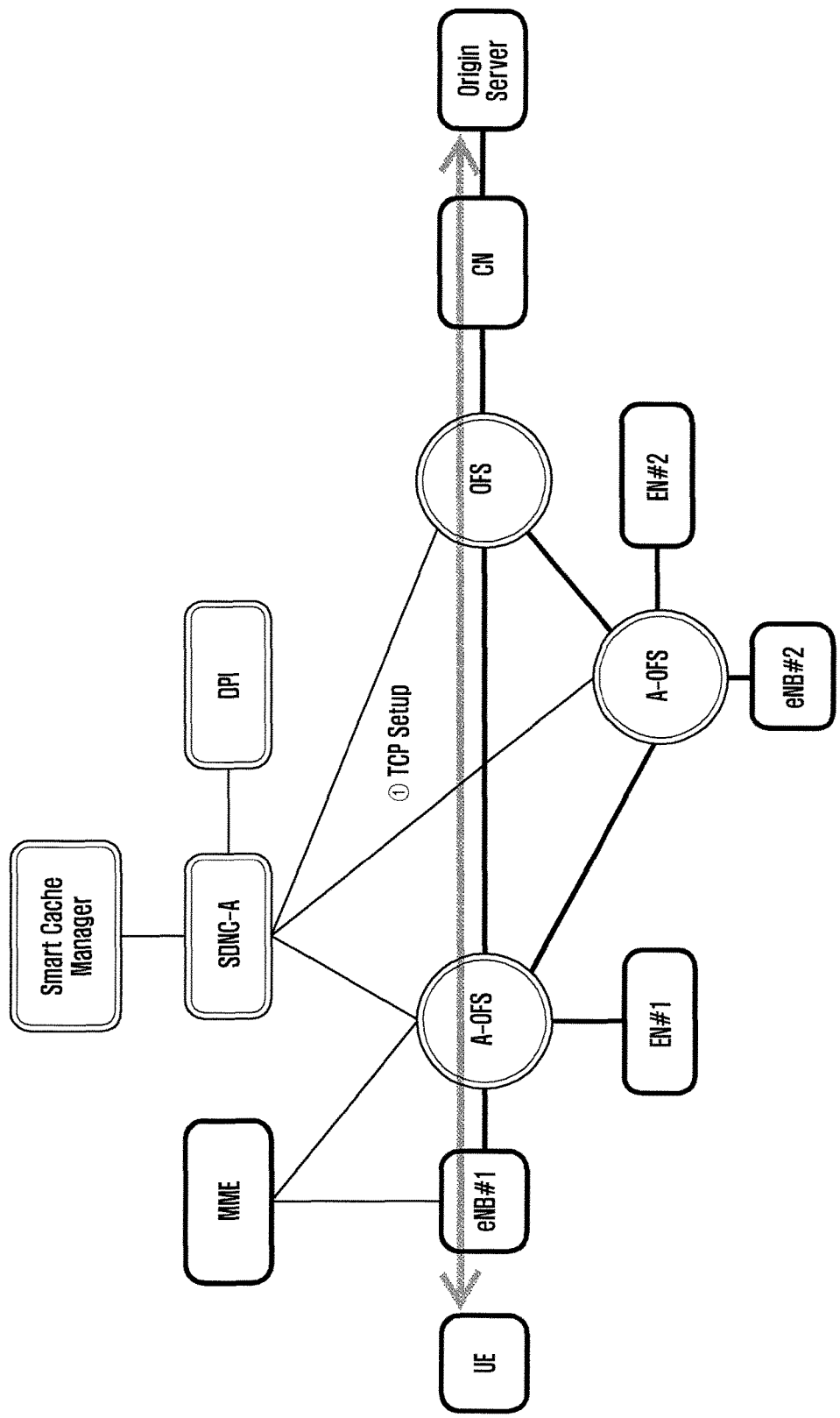
FIG. 18 is a diagram illustrating a process of establishing a TCP connection by a UE according to the present invention.

FIG. 18 is a diagram illustrating a process of establishing a TCP connection by a UE according to the present invention. Referring to FIG. 18, the UE establishes a TCP connection before forwarding the HTTP request message. The TCP connection of the UE is established with an origin server, and in this process, an Openflow switch operates in the same way as a general switch. In addition, the A-OFS has executed a GTP termination and then transmits the UE packet depending on the path established in the previous step.

Figure 19:
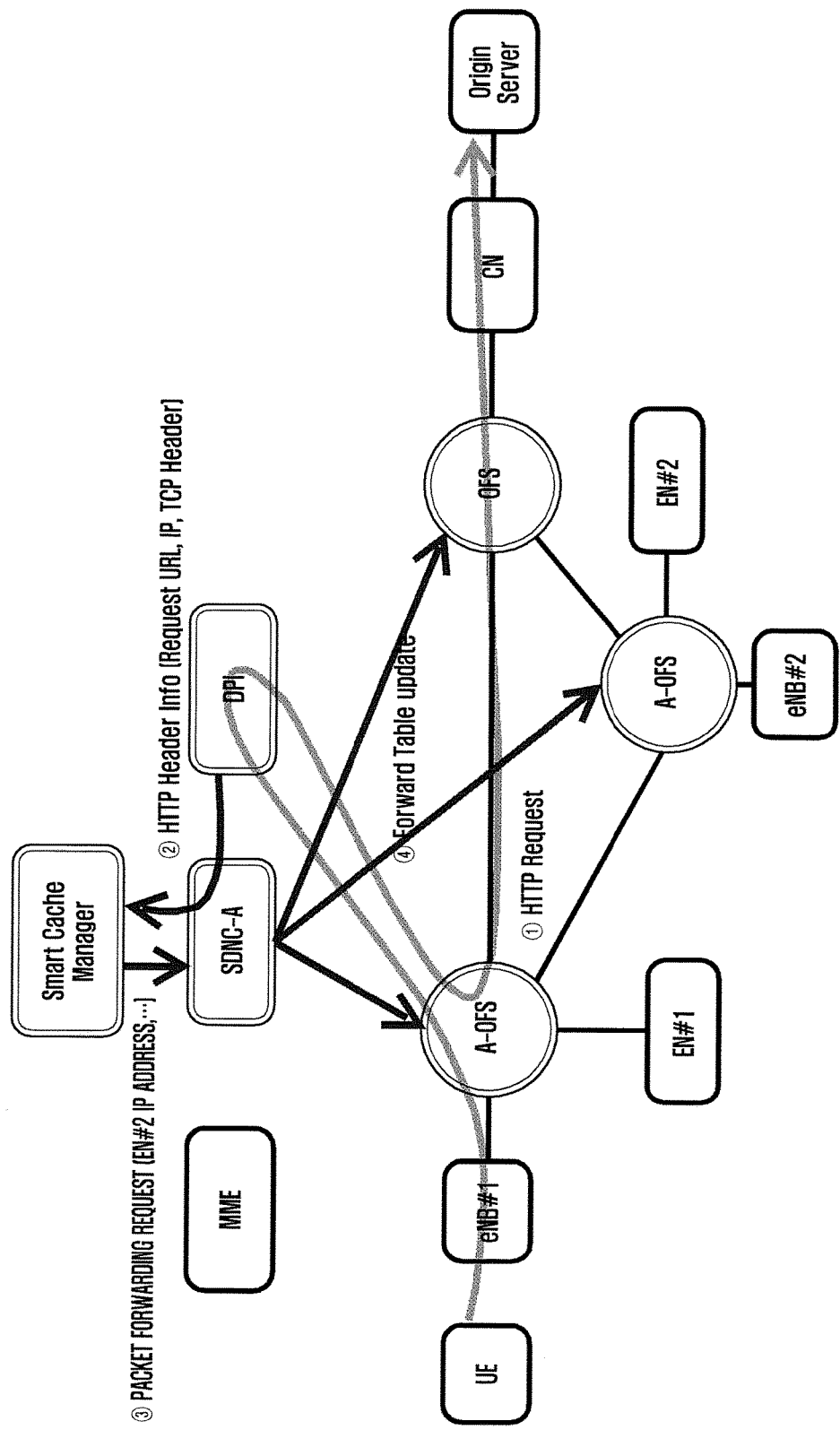
FIG. 19 is a diagram showing a first embodiment of processing the first HTTP GET request message by a UE according to the present invention.

FIG. 19 is a diagram showing a first embodiment of processing the first HTTP GET request message by a UE according to the present invention.

When receiving the HTTP GET request packet of the UE, the A-OFS identifies the packet as a new packet and transmits the packet to the DPI for analyzing. At this time, the A-OFS may transmit the packet as it is, which is transmitted by the UE, to the DPI, or may transmit the packet transmitted by the UE along a preset path after transmitting header information only to the DPI. FIG. 19 illustrates a case where the A-OFS transmits a part which needs to be analyzed without buffering the packet of the UE to the DPI and then transmits a packet of the UE along a predetermined path set.

The DPI analyzes the HTTP header information included in the HTTP request message based on the received information. At this time, the DPI extracts a URL, an IP address, TCP information, etc. from the HTTP header information and transmits them to the smart cache manager. The smart cache manager checks whether the content is already stored in the URL transmitted by the DPI. If the content is not stored in EN #1 of an eNB connected to a current UE, and the content is stored in EN #2 of an adjacent eNB, the smart cache manager configures a forwarding path of the Openflow flow switch to enable the UE packet to pass through the EN #2.

Figure 20:
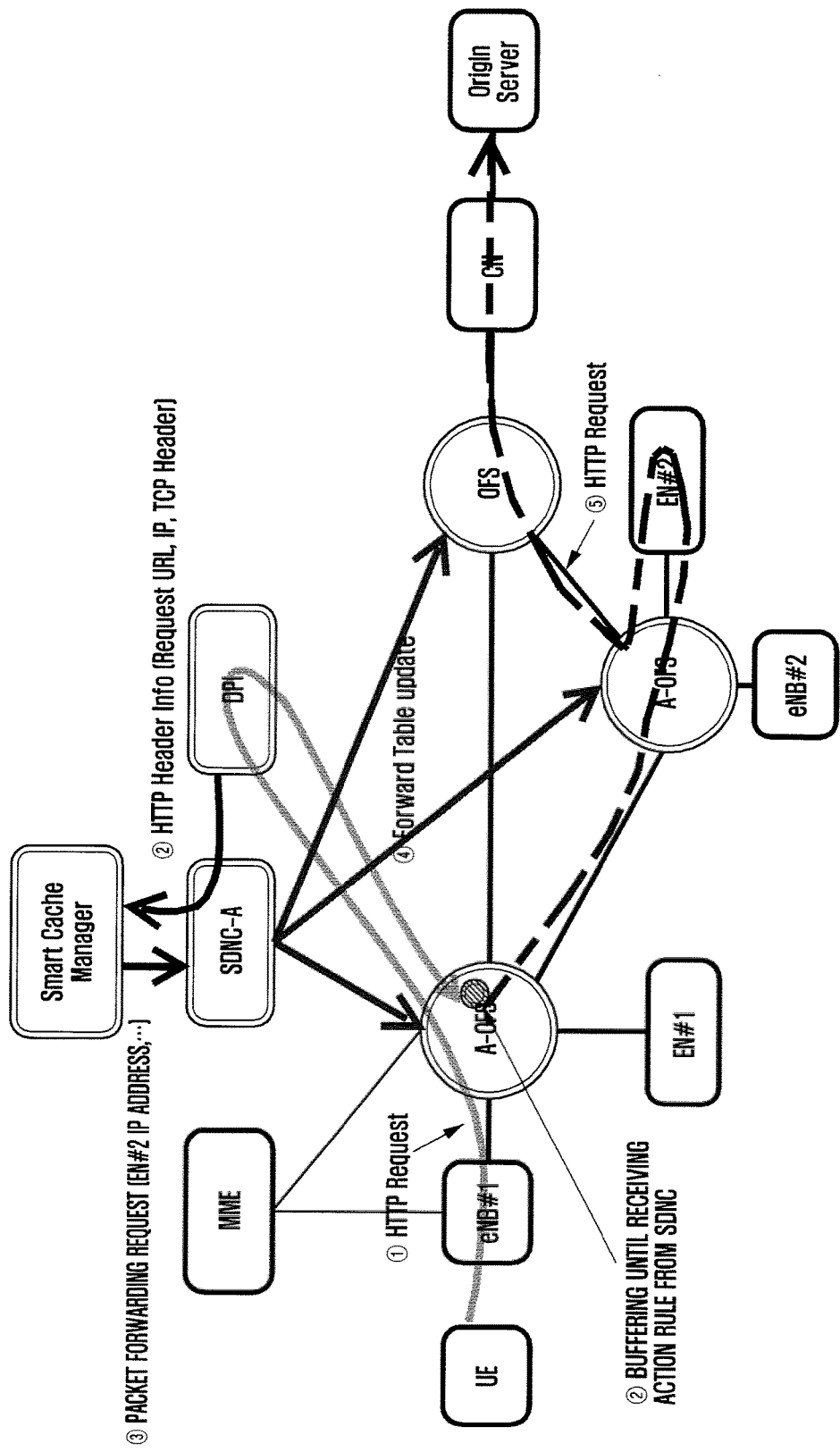
FIG. 20 is a diagram showing a second embodiment of processing the first HTTP GET request message by a UE according to the present invention.

FIG. 20 is a diagram showing a second embodiment of processing the first HTTP GET request message by a UE according to the present invention.

Specifically, FIG. 20 indicates a case where a switch (A-OFS) buffers the HTTP request packet until the DPI analyzes a first HTTP request packet and the smart cache manager transfers a forwarding path setup command to the SDNC. In this case, buffering can be operated similar to the above description, but because the switch buffers the request message, the request message is transmitted to an origin server via the EN #2 along the predetermined path by the switch.

Figure 21:
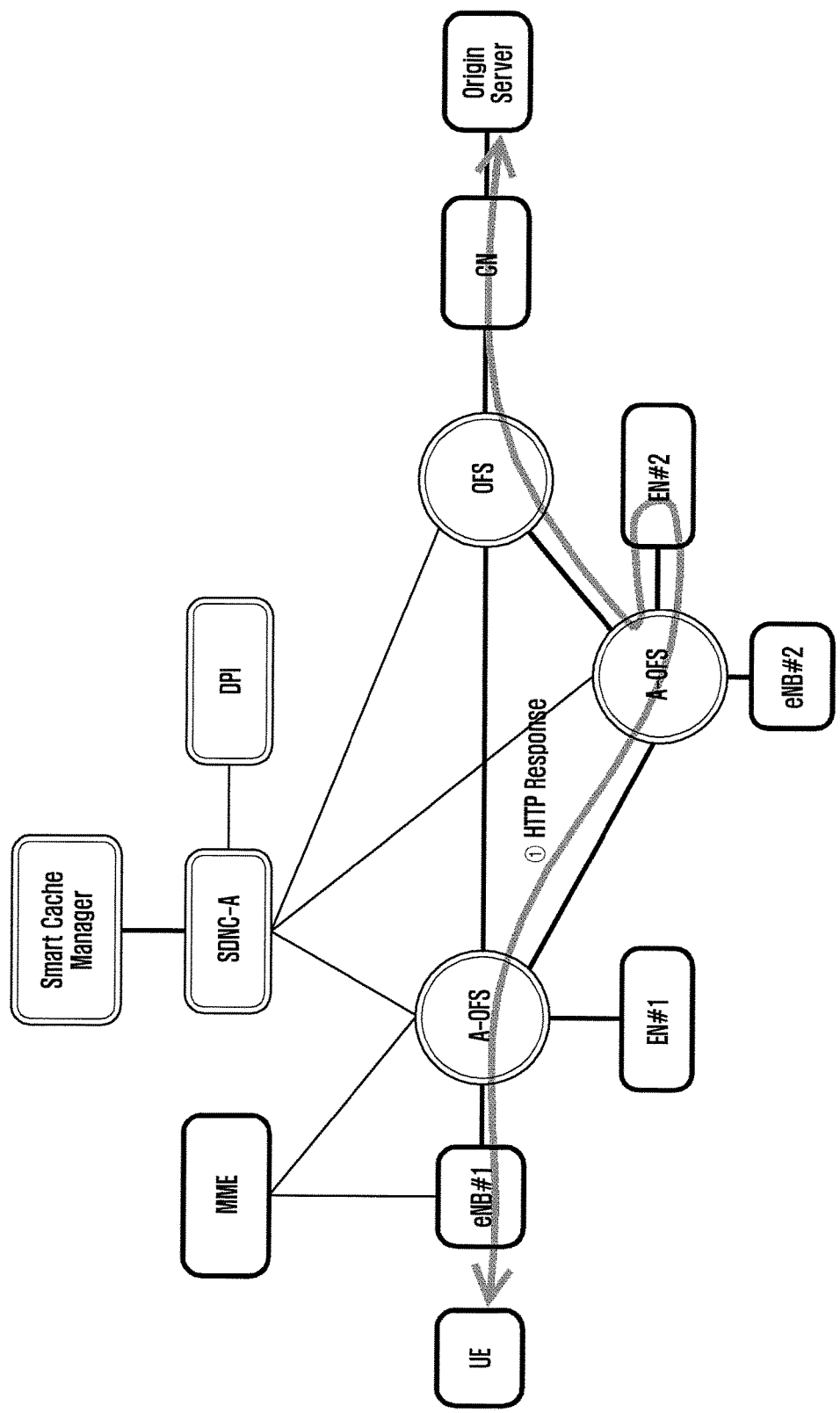
FIG. 21 is a diagram showing a process of transmitting an HTTP response packet along a predetermined path through EN #2 to a UE.

FIG. 21 is a diagram showing a process of transmitting an HTTP response packet along a predetermined path through EN #2 to the UE.

Figure 22:
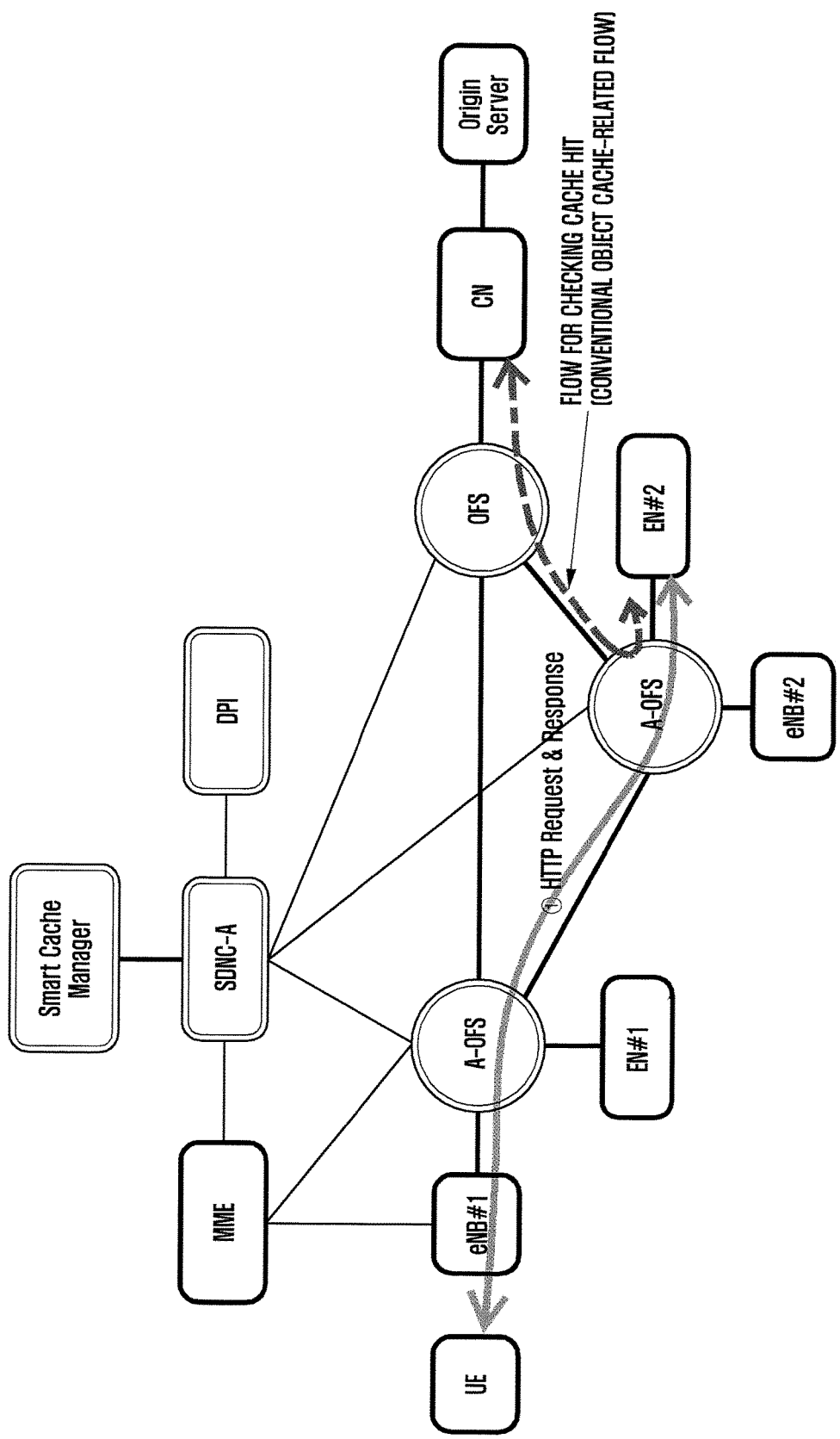
FIG. 22 is a diagram showing an HTTP packet path after Cache HIT.

FIG. 22 is a diagram showing an HTTP packet path after a cache hit.

In an embodiment of FIG. 22, since the content is stored in the EN #2, a cache HIT is performed, and thus the EN #2 operates as a direct content providing server. The EN #2 notifies of the cache HIT fact to the CN to enable the CN to cutoff the connection with the origin server, and creates the TCP state to operate as a TCP source using TCP state information transmitted by the CN and then directly transmits the content to the UE. Operations of the EN and the CN after the Cache HIT follow the operations as defined in a smart cache system.

Figure 23:
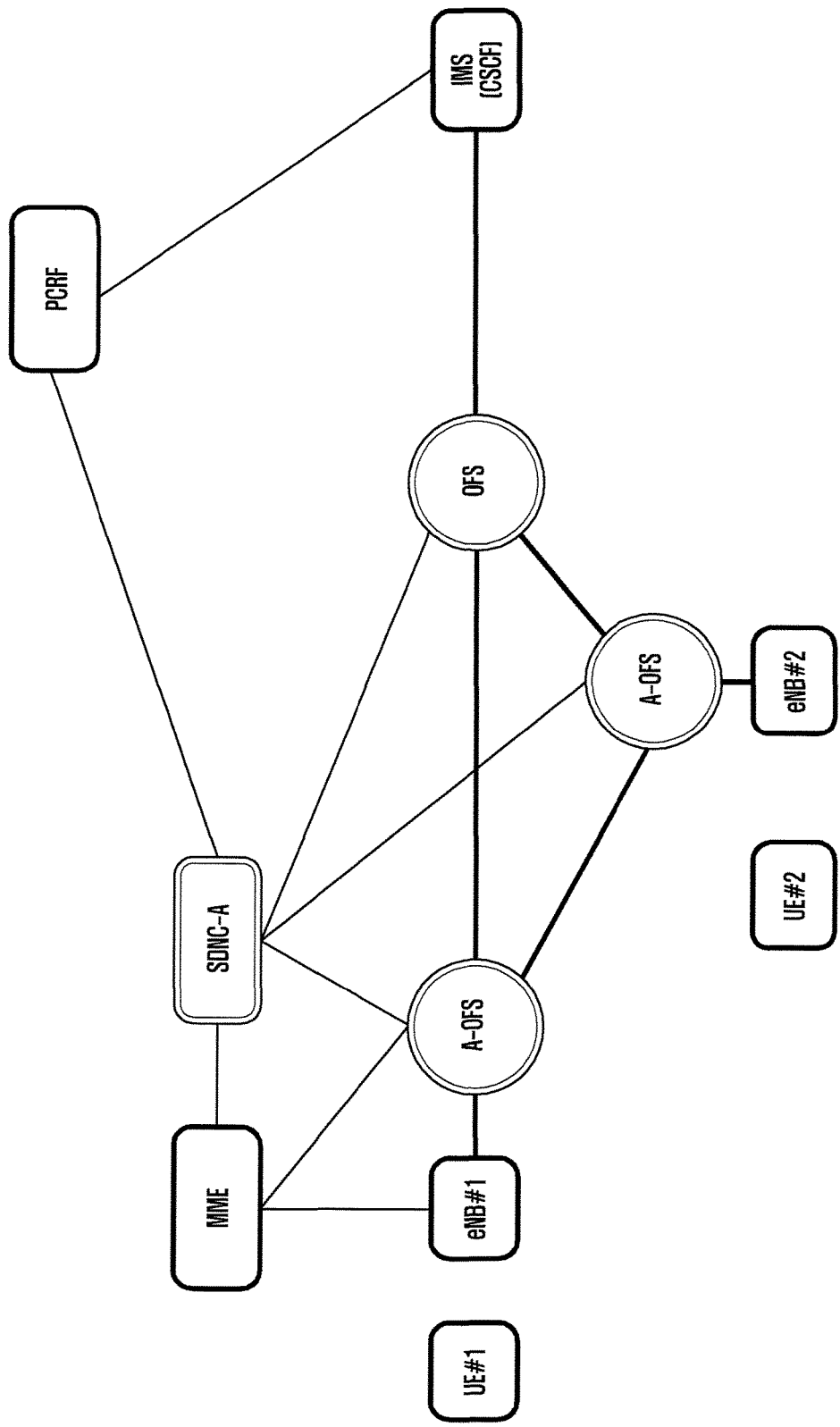
FIG. 23 is a diagram showing a mobile SDN network architecture for a VoLTE service.

Hereinafter, an embodiment of a VoLTE service according to the present invention will be described. The following embodiments will be described based on the mobile SDN network architecture for a VoLTE service shown in FIG. 23.

Figure 24:
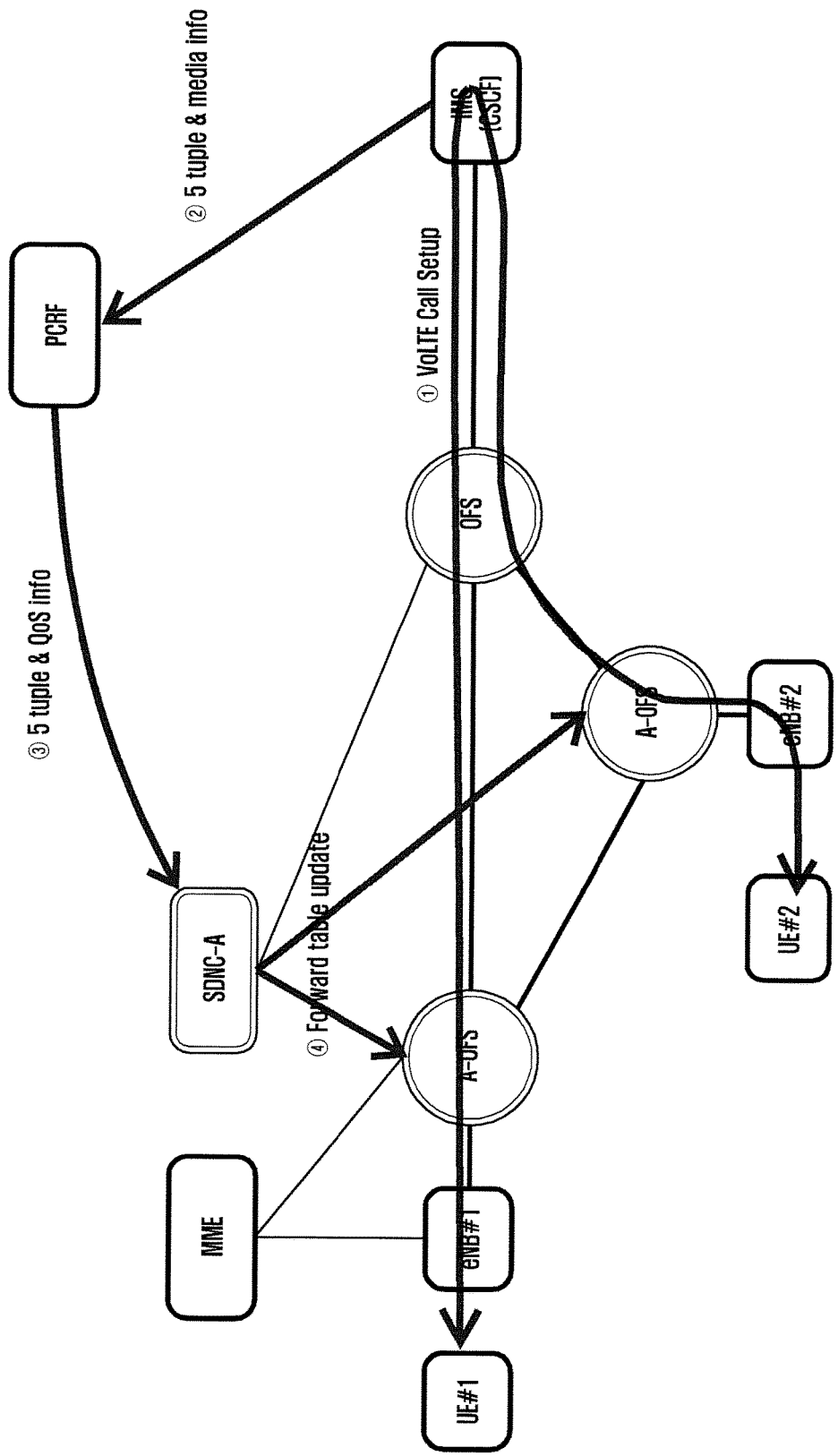
FIG. 24 is a diagram illustrating a VoLTE path setup procedure between a UE #1 and a UE #2 according to the present invention.

FIG. 24 is a diagram illustrating a VoLTE path setup procedure between a UE #1 and a UE #2 according to the present invention.

When assuming that the UE #1 is a transmitter and the UE #2 is a receiver, the IMS sets up the path with respect to a VoLTE call setup request from the UE #1 based on the IP address of the UE. Further, the IMS transmits 5 tuple information and QoS information of the flow to the PCRF. The PCRF delivers the 5 tuple information and QoS information received from the IMS to the SDNC using a RESTful API, and the SDNC calculates the optimal path from a pre-identified network structure on the basis of the information and sets the forwarding path of each switch.

Figure 25:
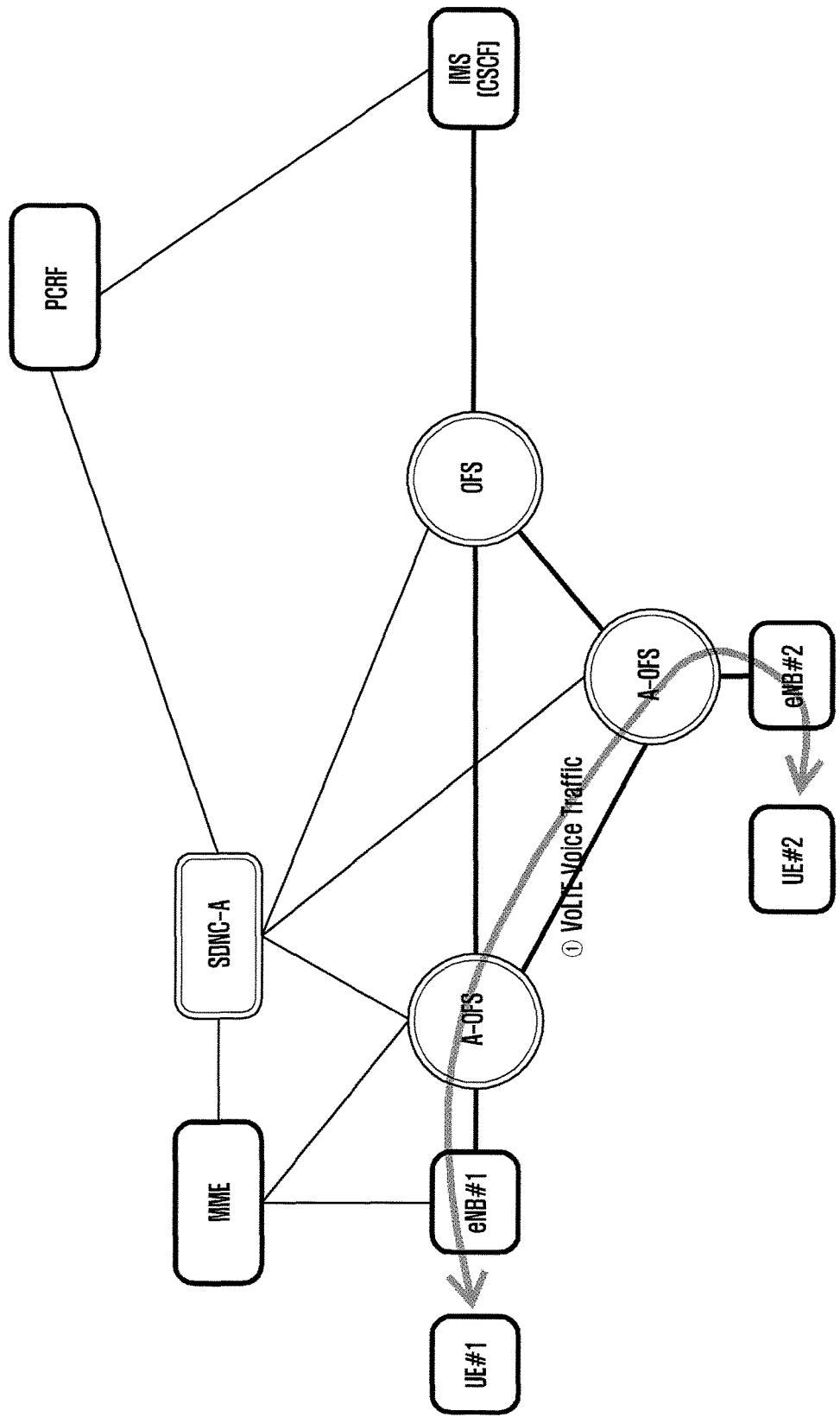
FIG. 25 is a diagram showing a path for two UEs that are setup in the optimum path by an SDNC to forward VoLTE traffic with each other.

FIG. 25 is a diagram showing a path for two UEs that are set up in the optimum path by an SDNC to forward VoLTE traffic with each other.

Since a UE #1 and a UE #2 belong to adjacent eNBs, only when a path between A-OFS connected to the eNB #1 and A-OFS connected to the eNB #2 is set up, the UE #1 and the UE #2 may exchange the VoLTE packet via the shortest distance. Accordingly, a delay caused in transferring a voice packet can be reduced and an improvement of the service quality can be achieved.

Figure 26:
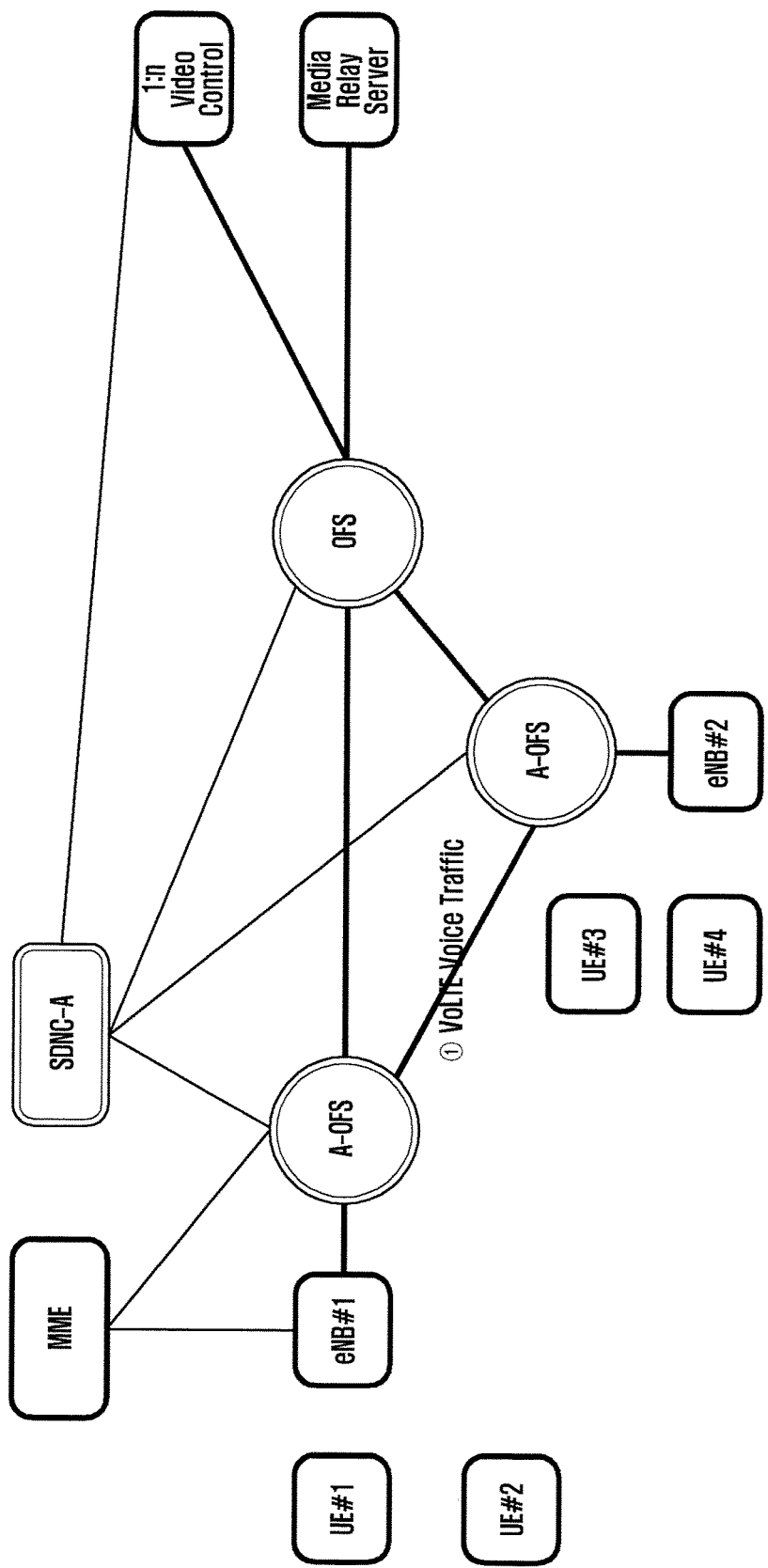
FIG. 26 is a diagram showing a mobile SDN network architecture for a 1:N media transmission.

Hereinafter, an embodiment of 1:N media sharing according to the present invention will be described. The following examples will be described based on the mobile SDN network architecture for 1:N media transmission shown in FIG. 26.

Figure 27:
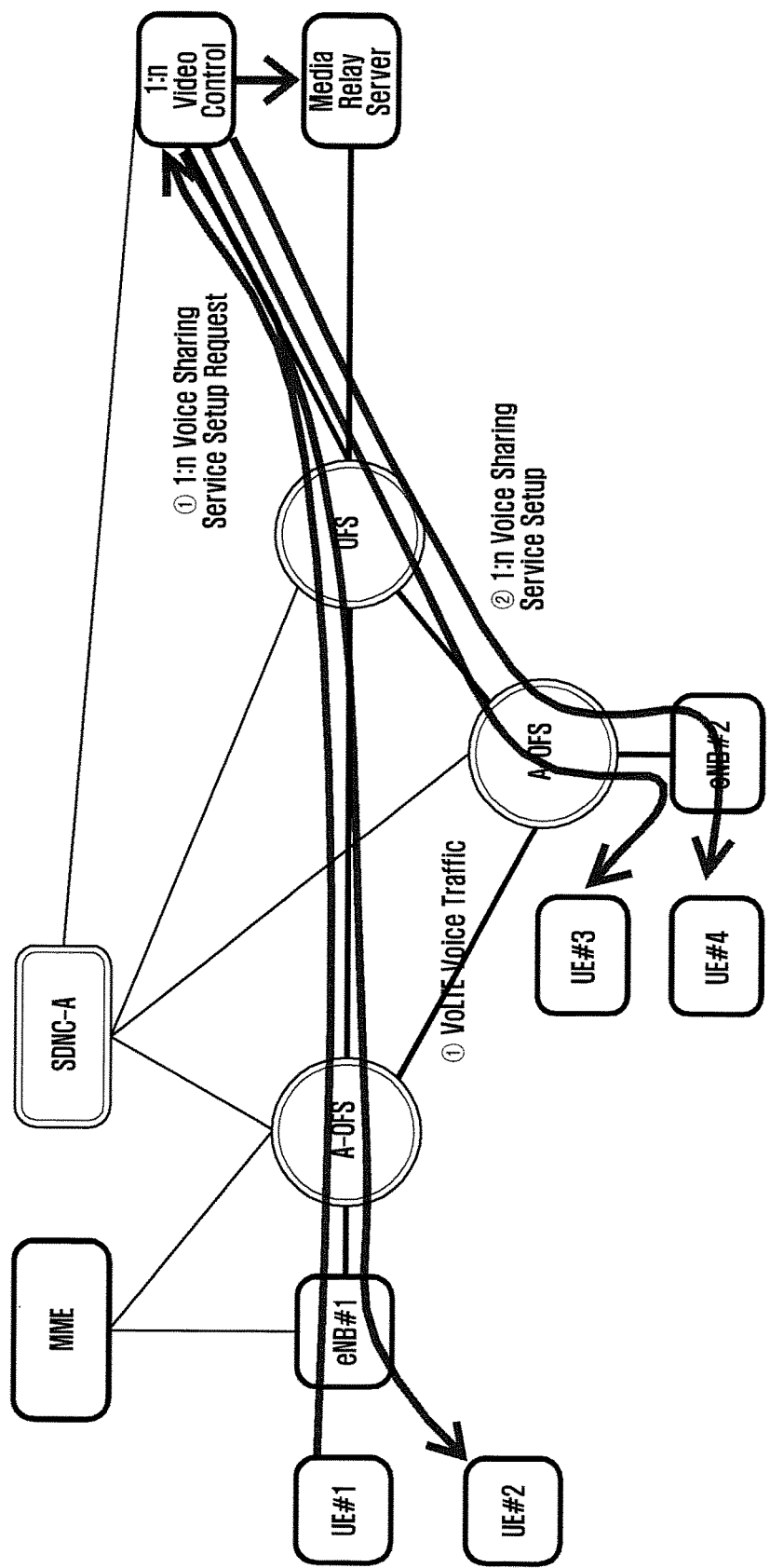
FIG. 27 is a diagram showing a video call setup procedure for 1:N media transmission according to the conventional technology.

FIG. 27 is a diagram showing a video call setup procedure for 1:N media transmission according to the conventional technology. In this embodiment, it is assumed that UE #1 is a video transmission source and UE #2 to UE #4 are video reception UEs. The UE #1 is aware of UE group information for receiving the video, and transmits request information for transmitting the video to each UE which is to receive the video. When a 1:N video controller receives the request information transmitted by the UE #1, the video controller sets up the bearer for each of the UE #2 to UE #4, and transmits the information to a server to be relayed the video transmitted by the UE #1.

Figure 28:
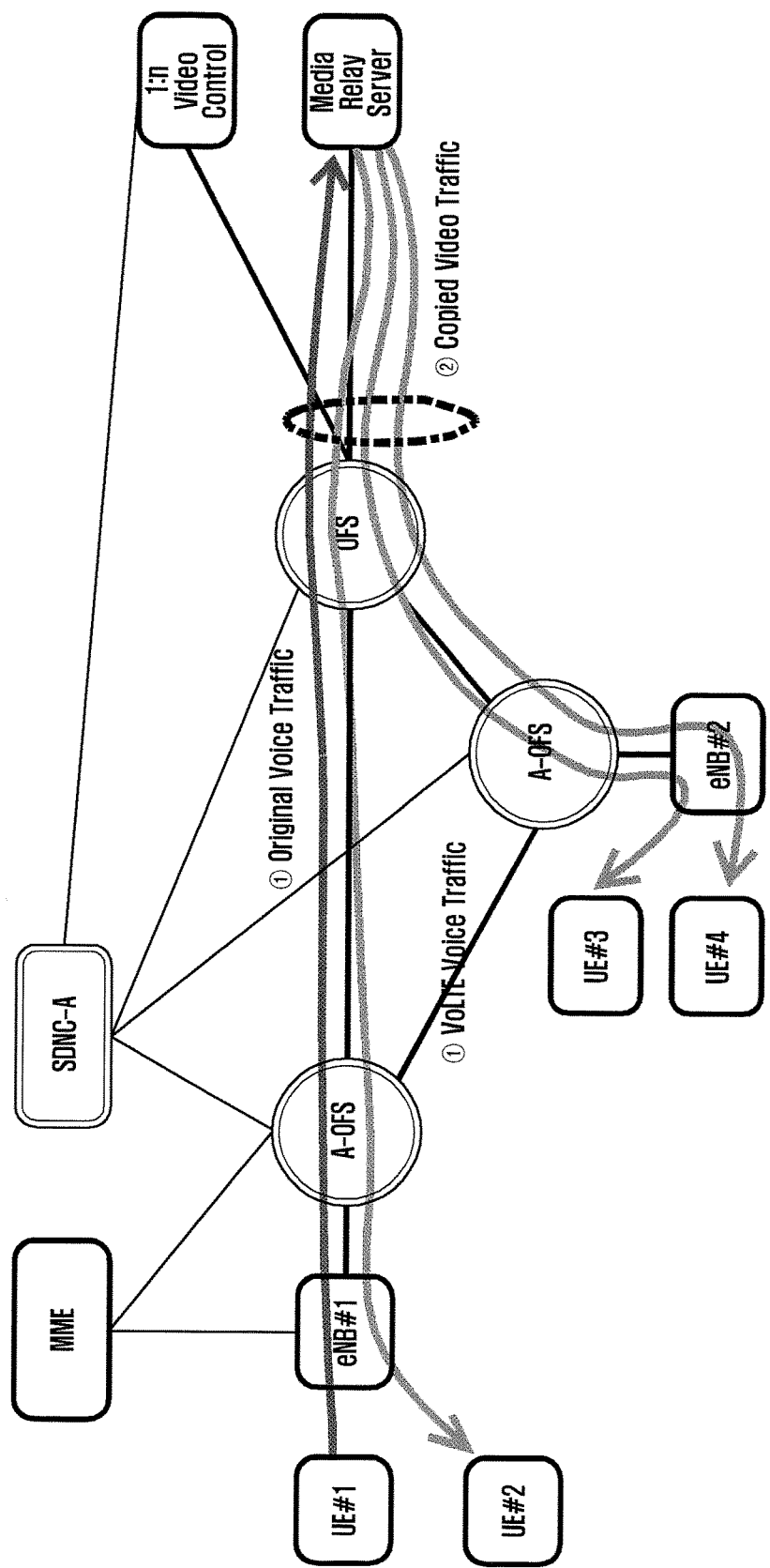
FIG. 28 is a diagram showing a 1:N media transmission method according to the conventional technology.

FIG. 28 is a diagram showing a 1:N media transmission method according to the conventional technology. Specifically, FIG. 28 shows the process of relaying video traffic transmitted by the UE #1 to each of the UEs by a media relay server based on the path established in FIG. 27.

The video traffic transmitted by the UE #1 is transferred to the relay server, and in a call setup step, the relay server transmits the video using a path that is set up through a video controller to each of the UEs by unicast transmission. When going through the above process, since the same video traffic is redundantly transferred to the UE via the LTE network, a load on the backhaul can be caused and the same traffic is transmitted multiple times, which wastes resources.

Figure 29:
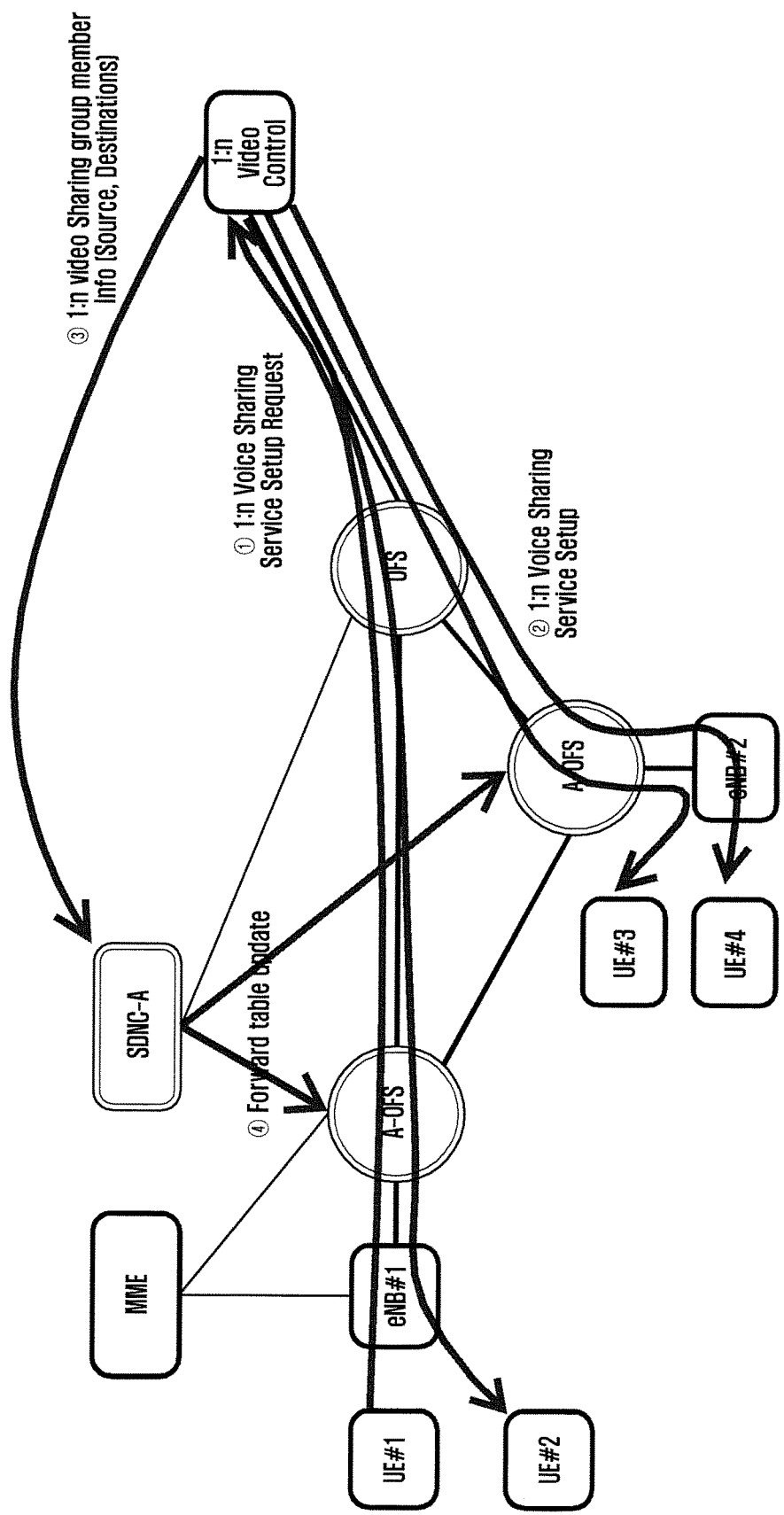
FIG. 29 is a diagram showing a video call setup procedure for 1:N media transmission when applying SDN according to the present invention.

FIG. 29 is a diagram showing a video call setup procedure for 1:N media transmission when applying SDN according to the present invention.

If the UE #1 requests a video call setup, a video controller sets up a path for each UE based on the group information. In addition, the video controller transfers UE information associated with the video call to the SDNC using a RESTful API. The group information associated with the video call may include the source/destination IP address information of a UE #1 to a UE #4. In order to transmit the video traffic transmitted by the UE #1 based on the address of the transferred source node and destination node to the UE #2 to UE #4, the SDNC transmits packet mirroring and forwarding commands to each Openflow switch. Based on this information, each Openflow switch will be able to know where a packet is to be transmitted with respect to the flow.

Figure 30:
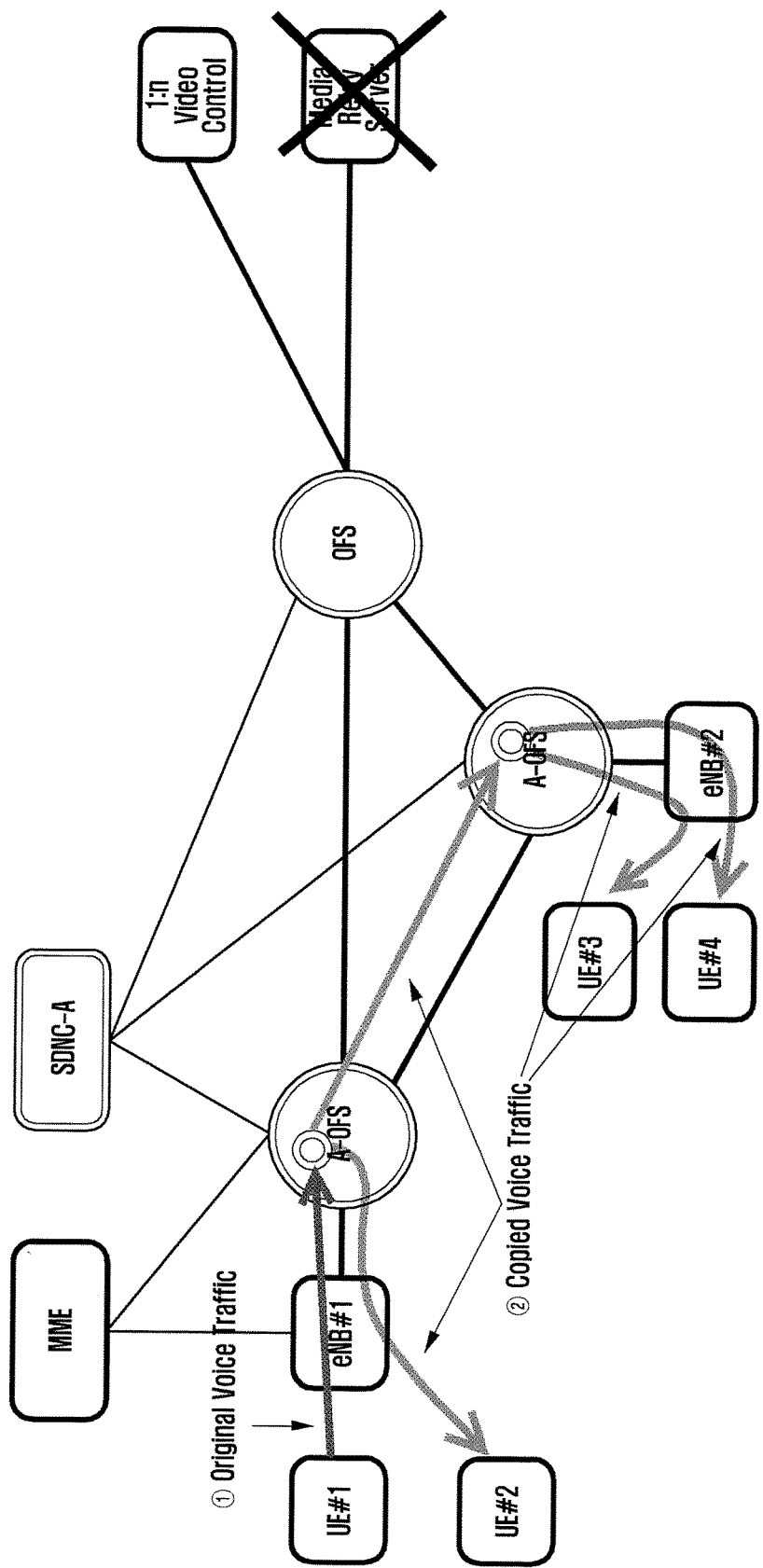
FIG. 30 is a diagram showing a transmission method of applying SDN according to the present invention.

FIG. 30 is a diagram showing a transmission method of applying SDN according to the present invention. Specifically, FIG. 30 shows a process of transferring video traffic transmitted by a UE #1 to a UE #2 to a UE #4 by a mirroring and forward policy set by the SDNC.

The video packet transmitted by the UE #1 is transferred to an A-OFS connected to an eNB #1. The A-OFS may know, based on the information transmitted by the SDNC, in a call setup step, the fact that the received packet should be transferred to the UE #2, and the fact that the received packet should be transferred to the A-OFS connected to the eNB #2 in order to be transferred to the UE #3 and UE #4. Thus, the A-OFS copies the packet transmitted by the UE #1 and transmits the packet to UE #2 and the A-OFS connected to the eNB #2. The A-OFS connected to the eNB #2 may know that the received information is to be transmitted to the UE #3 and UE #4, respectively, based on the information transmitted by the SDNC, in the call setup step. Thus, the A-OFS connected to the eNB #2 copies the received packet and transmits the copied packet to the UE #3 and UE #4. Through such a process, according to an embodiment of the present invention, 1:N video traffic can be transmitted using a minimum number of paths and network resources.

It will be understood by those skilled in the art to which the present invention belongs that the present invention may be changed and modified without departing from the scope and the spirit of the present invention. Accordingly, the embodiments disclosed in the present invention are only for describing, but not limiting, the technical idea of the present invention, and the scope of the technical idea of the present invention is not limited by the embodiments. The scope of the present invention shall be construed on the basis of the accompanying claims in such a manner that all of the technical ideas included within the scope equivalent to the claims belong to the present invention.

The invention claimed is:

1. A method for controlling communication by a software-defined networking (SDN) controller in an SDN based wireless communication network, the method comprising:
   receiving, from a gateway controller, information on a UE as the UE initially accesses an eNB;
   selecting at least one openflow switch (OFS) for processing traffic of the UE based on the information;
   transmitting, to the at least one OFS, a request for setting a packet forwarding rule for processing the traffic of the UE; and
   receiving, from the gateway controller, information on a transition from a connected state to a standby state of the UE and a request for forwarding downlink data, transmitted to the UE in the standby state; and
   transmitting, to the at least one OFS, a request for updating the packet forwarding rule for forwarding the downlink data, transmitted to the UE in the standby state.

2. The method of claim 1, wherein the information on the UE comprises at least one of an IP address of the UE, an address of the eNB, or IMSI information.

3. The method of claim 1, further comprising:
   receiving, from the gateway controller, information on a disconnection of the UE and the eNB; and
   transmitting, to the at least one OFS, a request for deleting the packet forwarding rule for processing.

4. The method of claim 1, further comprising:
   receiving, from the gateway controller, a request for allocating an OFS for paging;
   allocating the OFS for paging based on the information; and
   transmitting, to the OFS for paging, a request for updating the packet forwarding rule for processing.

5. The method of claim 1, further comprising transmitting, to the at least one OFS, the request for updating the packet forwarding rule for processing based on information of a configured bearer, if a bearer for the UE is configured.

6. The method of claim 5, further comprising transmitting, to the at least one OFS, the request for updating the packet forwarding rule for processing based on information of a modified bearer, if the configured bearer is modified.

7. The method of claim 1, further comprising:
   receiving information on a handover from the gateway controller if the handover of the UE is performed;
   selecting an OFS for handover based on the information on the handover; and
   transmitting, to the OFS for handover, a request for setting the packet forwarding rule for processing.

8. The method of claim 1, further comprising:
   receiving, from a cache server, path information of a content requested by the UE; and
   transmitting, to the at least one OFS, a request for updating the packet forwarding rule for processing based on the path information of the content.

9. The method of claim 1, further comprising:
determining a traffic path for exchanging traffic between a first UE and a second UE based on information received from a policy management server; and
transmitting a request for updating the packet forwarding rule for processing to the at least one OFS based on the determined traffic path.

10. The method of claim 1, further comprising:
receiving information on one or more other UEs to which the UE is to transmit traffic;
determining a transmission path of the traffic based on information on the one or more other UEs; and
transmitting a request for updating the packet forwarding rule for processing to the OFS for each of the one or more other UEs based on the transmission path of the traffic.

11. A method for controlling communication by a gateway controller in a software-defined networking (SDN) based wireless communication network, the method comprising:
allocating an IP address to a UE if an eNB connection request from the UE is received;
transmitting, to an SDN controller, information on the UE;
receiving, from the SDN controller, information on at least one openflow switch (OFS) that is selected for processing traffic of the UE based on the information on the UE; and
transmitting, to the SDN controller, information on a transition from a connected state to a standby state of the UE and a request for forwarding downlink data, transmitted to the UE in the standby state,
wherein a packet forwarding rule for processing the traffic of the UE is updated based on the information on a transition from a connected state to a standby state of the UE and the request for forwarding the downlink data.

12. The method of claim 11, wherein the information on the UE comprises at least one of an IP address of the UE, an address of an eNB, or IMSI information.

13. The method of claim 11, further comprising transmitting, to the SDN controller, information on a disconnection of the UE and an eNB if a request for the disconnection from the UE is received.

14. The method of claim 11, further comprising transmitting, to the SDN controller, the information of a configured or modified bearer if a bearer for the UE is configured or modified.

15. The method of claim 11, further comprising:
when performing a handover by the UE, transmitting, to the SDN controller, information on the handover; and
receiving, from the SDN controller, information on an OFS for the handover selected on the basis of the information on the handover.

16. The method of claim 11, further comprising:
transmitting an HTTP request to a data packet inspection (DPI) if the HTTP request is received; and
transmitting a content corresponding to the HTTP request to a traffic transmission path determined by the SDN controller based on the HTTP request.

17. The method of claim 11, further comprising establishing a traffic path between a first UE and a second UE that is determined by the SDN controller based on information received from a policy management server.

18. The method of claim 11, further comprising establishing a transmission path of traffic determined by the SDN controller based on the information on at least one other UE to which the UE is to transmit the traffic.

* * * * *